(12) United States Patent
Sachs et al.

(10) Patent No.: US 12,166,683 B2
(45) Date of Patent: Dec. 10, 2024

(54) OUTPUT PACING IN A CELLULAR COMMUNICATIONS SYSTEM SERVING AS A TIME-SENSITIVE NETWORKING (TSN) NODE

(71) Applicant: Telefonaktiebolaget LM Ericsson (publ), Stockholm (SE)

(72) Inventors: Joachim Sachs, Sollentuna (SE); János Farkas, Kecskemét (HU); Balázs Varga, Budapest (HU); Dinand Roeland, Sollentuna (SE); György Miklós, Pilisborosjenö (HU); Kun Wang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/294,997

(22) PCT Filed: Nov. 19, 2019

(86) PCT No.: PCT/IB2019/059942
§ 371 (c)(1),
(2) Date: May 18, 2021

(87) PCT Pub. No.: WO2020/104946
PCT Pub. Date: May 28, 2020

(65) Prior Publication Data
US 2022/0021624 A1 Jan. 20, 2022

Related U.S. Application Data

(60) Provisional application No. 62/769,372, filed on Nov. 19, 2018.

(51) Int. Cl.
*H04L 47/38* (2022.01)
*H04B 7/185* (2006.01)
(Continued)

(52) U.S. Cl.
CPC .......... *H04L 47/28* (2013.01); *H04B 7/18591* (2013.01); *H04L 47/38* (2013.01); *H04W 28/0268* (2013.01)

(58) Field of Classification Search
CPC ......... H04L 41/50; H04L 47/22; H04L 47/28; H04L 47/32; H04L 47/56; H04L 47/244;
(Continued)

(56) References Cited

U.S. PATENT DOCUMENTS 9,332,579 B2    5/2016  Scherer et al.
11,088,962 B2 *  8/2021  Chen ..................... H04L 47/805
(Continued)

FOREIGN PATENT DOCUMENTS

CN    108366023 A    8/2018
CN    108809852 A   11/2018
(Continued)

OTHER PUBLICATIONS

N. Finn, "Introduction to Time-Sensitive Networking," in IEEE Communications Standards Magazine, vol. 2, No. 2, pp. 22-28, Jun. 2018, doi: 10.1109/MCOMSTD.2018.1700076. (Year: 2018).*
(Continued)

*Primary Examiner* — Tom Y Chang
(74) *Attorney, Agent, or Firm* — Withrow & Terranova, PLLC

(57) ABSTRACT

Systems and methods are disclosed herein for output pacing in a cellular communications system that serves as a virtual Time-Sensitive Networking (TSN) node in a TSN network. In some embodiments, a method of operation of a boundary node associated with a cellular communications system that operates as a virtual TSN node in a TSN network comprises receiving user plane traffic from a node in the cellular communications system. The user plane traffic is user plane traffic received by the cellular communications system from
(Continued)

a previous hop TSN node. The method further comprises performing output pacing for the user plane traffic when outputting the user plane traffic to a next hop TSN node such that the user plane traffic is output to the next hop TSN node at a rate that matches a desired rate at the next hop TSN node. Corresponding embodiments of a boundary node are also disclosed.

20 Claims, 14 Drawing Sheets

(51) Int. Cl.
　　*H04L 47/28*　　(2022.01)
　　*H04W 28/02*　　(2009.01)
(58) Field of Classification Search
　　CPC .... H04L 47/2441; H04N 28/10; H04N 24/02; H04N 56/00
　　See application file for complete search history.

(56) References Cited

U.S. PATENT DOCUMENTS

| | | |
|---|---|---|
| 2015/0373660 A1 | 12/2015 | Gunnarsson et al. |
| 2018/0184428 A1 | 6/2018 | Cariou et al. |
| 2018/0220356 A1 | 8/2018 | Tenny et al. |
| 2019/0297025 A1 | 9/2019 | Kobayashi et al. |
| 2019/0322299 A1* | 10/2019 | Mong ............... B61L 15/0072 |
| 2019/0363843 A1 | 11/2019 | Gordaychik |
| 2020/0053678 A1 | 2/2020 | Moon et al. |
| 2020/0059829 A1 | 2/2020 | Joseph et al. |
| 2020/0137615 A1 | 4/2020 | Joseph et al. |
| 2020/0389405 A1 | 12/2020 | Mardmoeller et al. |
| 2021/0007160 A1 | 1/2021 | Sivasiva Ganesan et al. |
| 2021/0204172 A1* | 7/2021 | Rost ....................... H04W 28/10 |
| 2021/0243641 A1 | 8/2021 | Gangakhedkar et al. |
| 2021/0306901 A1* | 9/2021 | Mannweiler ............ H04L 45/02 |
| 2021/0306910 A1* | 9/2021 | Guo .................... H04W 56/001 |
| 2022/0022088 A1 | 1/2022 | Gebert et al. |
| 2022/0224651 A1 | 7/2022 | Rost et al. |

FOREIGN PATENT DOCUMENTS

| | | |
|---|---|---|
| CN | 111865830 | 10/2020 |
| WO | 2017082779 A1 | 5/2017 |
| WO | 2018166576 A1 | 9/2018 |
| WO | 2020148616 A1 | 7/2020 |
| WO | 2020165857 A1 | 8/2020 |

OTHER PUBLICATIONS

TSN performance requirements evaluation, 3gpp TSG RAN WG2 Meeting , pp. 1-9, published Oct. 12, 2018, https://www.3gpp.org/ftp/tsg_ran/wg2_rl2/TSGR2_103bis/Docs/r2-1814922.zip retrieved from internet Dec. 2, 2023 (Year: 2018).*
Author Unknown, "Draft Standard for Local and metropolitan area networks—Bridges and Bridged Networks; Amendment: Stream Reservation Protocol (SRP) Enhancements and Performance Improvements," IEEE P802.1Qcc/D2.3, May 3, 2018, 214 pages.
Huawei, et al., "S2-1900590: Discussion on system enhancement for TSN logical bridge management," 3GPP TSG-SA WG2 Meeting #130, Jan. 21-25, 2019, Kochi, India, 4 pages.
Office Action for Chinese Patent Application No. 202080014340.3, mailed Jan. 21, 2022, 6 pages.
Author Unknown, "3rd Generation Partnership Project; Technical Specification Group Services and System Aspects; Study on Communication for Automation in Vertical Domains (Release 16)," 3GPP TR 22.804 V16.1.0, Sep. 2018, 3GPP Organizational Partners, 189 pages.
Author Unknown, "3rd Generation Partnership Project; Technical Specification Group Services and System Aspects; Study on 5GS Enhanced support of Vertical and LAN Services (Release 16)," 3GPP TR 23.734 V0.2.0, Sep. 2018, 3GPP Organizational Partners, 39 pages.
Author Unknown, "3rd Generation Partnership Project; Technical Specification Group Radio Access Network; Study on NR Industrial Internet of Things (IoT); Release 16," 3GPP TR 38.825 V0.0.0, Sep. 2018, 3GPP Organizational Partners, 10 pages.
Author Unknown, "3rd Generation Partnership Project; Technical Specification Group Services and System Aspects; System Architecture for the 5G System; Stage 2 (Release 15)," 3GPP TS 23.501 V15.3.0, Sep. 2018, 3GPP Organizational Partners, 226 pages.
CATT, "R2-1816363: 5GS and TSN Integration," 3GPP TSG-RAN WG2 Meeting #104, Nov. 12-16, 2018, Spokane, USA, 5 pages.
Huawei et al., "S2-1811211: QoS Negotiation between 3GPP and TSN networks KI#3.1," SA WG2 Meeting #129, Oct. 15-19, 2018, Dongguan, China, 10 pages.
Kagermann, H. et al., "Recommendations for implementing the strategic initiative Industrie 4.0," Final report of the Industrie 4.0 Working Group, Apr. 2013, acatech—National Academy of Science and Engineering, Munich, 97 pages.
Nokia et al., "R2-1814992: TSN performance requirements evaluation," 3GPP TSG-RAN WG2 Meeting #103bis, Oct. 8-12, 2018, Chengdu, China, 9 pages.
Nokia et al., "S2-1810436: TSN—QoS Framework," SA WG2 Meeting #129, Oct. 15-19, 2018, Dongguan, China, 9 pages.
International Search Report and Written Opinion for International Patent Application No. PCT/IB2019/059942, mailed Feb. 4, 2020, 17 pages.
Written Opinion for International Patent Application No. PCT/IB2019/059942, mailed Oct. 7, 2020, 11 pages.
International Preliminary Report on Patentability for International Patent Application No. PCT/IB2019/059942, mailed Feb. 9, 2021, 24 pages.
Author Unknown, "Technical Specification Group Services and System Aspects; Study on enhancement of 5G System (5GS) for vertical and Local Area Network (LAN) services (Release 16)," Technical Report 23.734, Version 16.2.0, Jun. 2019, 3GPP Organizational Partners, 117 pages.
Author Unknown, "Technical Specification Group Services and System Aspects; System Architecture for the 5G System; Stage 2 (Release 16)," Technical Specification 23.501, Version 16.0.2, Apr. 2019, 3GPP Organizational Partners, 317 pages.
Author Unknown, "Technical Specification Group Services and System Aspects; Procedures for the 5G System; Stage 2 (Release 16)," Technical Specification 23.502, Version 16.0.2, Apr. 2019, 3GPP Organizational Partners, 419 pages.
Neumann, Arne, et al., "Towards Integration of Industrial Ethernet with 5G Mobile Networks," International Workshop on Factory Communication Systems, Jun. 2018, IEEE, 4 pages.
Nokia, et al., "S2-1903656: Update to Support PDU Session Binding," SA WG2 Meeting #132, Apr. 8-12, 2019, Xian, China, 4 pages.
Qualcomm Incorporated, et al., "S2-1906754: Addressing Editor's notes on TSN," 3GPP TSG-SA2 Meeting #133, May 13-17, 2019, Reno, Nevada, 13 pages.
Invitation to Pay Additional Fees and Partial Search for International Patent Application No. PCT/IB2020/054483, mailed Aug. 17, 2020, 15 pages.
International Search Report and Written Opinion for International Patent Application No. PCT/IB2020/054483, mailed Oct. 8, 2020, 21 pages.
Author Unknown, "Technical Specification Group Services and System Aspects; Service requirements for cyber-physical control applications in vertical domains; Stage 1 (Release 16)," Technical Specification 22.104, Version 1.0.0, 3GPP Organizational Partners, Dec. 2018, 55 pages.
Author Unknown, "Technical Specification Group Services and System Aspects; Study on Communication for Automation in Vertical Domains (Release 16)," Technical Report 22.804, Version 16.2.0, 3GPP Organizational Partners, Dec. 2018, 196 pages.

(56) References Cited

OTHER PUBLICATIONS

Author Unknown, "Technical Specification Group Services and System Aspects; System Architecture for the 5G System (5GS); Stage 2 (Release 15)," Technical Specification 23.501, Version 15.8.0, 3GPP Organizational Partners, Dec. 2019, 248 pages.

Author Unknown, "Technical Specification Group Services and System Aspects; Procedures for the 5G System; Stage 2 (Release 15)," Technical Specification 23.502, Version 15.4.0, 3GPP Organizational Partners, Dec. 2018, 346 pages.

Author Unknown, "Technical Specification Group Services and System Aspects; Policy and Charging Control Framework for the 5G System; Stage 2 (Release 15)," Technical Specification 23.503, Version 15.3.0, 3GPP Organizational Partners, Sep. 2018, 70 pages.

Author Unknown, "Technical Specification Group Services and System Aspects; Policy and Charging Control Framework for the 5G System; Stage 2 (Release 15)," Technical Specification 23.503, Version 15.4.0, 3GPP Organizational Partners, Dec. 2018, 76 pages.

Author Unknown, "Technical Specification Group Services and System Aspects; Study on Cellular Internet of Things (IoT) support and evolution for the 5G System (Release 16)," Technical Report 23.724, Version 16.0.0, 3GPP Organizational Partners, Dec. 2018, 276 pages.

Author Unknown, "Technical Specification Group Services and System Aspects; Study on enhanement of 5GS for Vertical and LAN Services (Release 16)," Technical Report 23.734, Version 16.0.0, 3GPP Organizational Partners, Dec. 2018, 107 pages.

Author Unknown, "Technical Specification Group Services and System Aspects; Study on enhanement of 5GS for Vertical and LAN Services (Release 16)," Technical Report 23.734, Version 16.1.0, 3GPP Organizational Partners, Mar. 2019, 111 pages.

Author Unknown, "Technical Specification Group Radio Access Network; NG-RAN; NG Application Protocol (NGAP) (Release 15)," Technical Specification 38.413, Version 15.5.0, 3GPP Organizational Partners, Sep. 2019, 329 pages.

Author Unknown, "IEEE Standard for Local and metropolitan area networks—Bridges and Bridged Networks, Amendment 25: Enhancements for Scheduled Traffic," IEEE Computer Society, IEEE Std 802.1Qbv, 2015, 57 pages.

Ericsson, "C3-182341: Changes to C3-182188: QoS Parameter mapping in PCF," Third Generation Partnership Project (3GPP), TSG-CT WG3 Meeting #96, Apr. 16-20, 2018, Kunming, China, 8 pages.

Ericsson, "S2-19xxxx: Support for IEEE 802.1Qbv scheduling," 3GPP TSG-SA WG2 Meeting #131, Feb. 25-Mar. 1, 2019, Santa Cruz, Spain, 7 pages.

Ericsson, "S2-19xxxx: TSN-5GS QoS parameters mapping," 3GPP TSG-SA WG2 Meeting #131, Feb. 25-Mar. 1, 2019, Santa Cruz, Spain, 13 pages.

Ericsson, "S2-1900610: Additional TSN traffic patter for RAN optimization," Third Generation Partnership Project (3GPP), TSG-SA WG2 Meeting #130, Jan. 21-25, 2019, Kochi, India, 6 pages.

Ericsson, "S2-1901150: TSN QoS and traffic scheduling in 5GS," Third Generation Partnership Project (3GPP), TSG-SA WG2 Meeting #130, Jan. 21-25, 2019, Kochi, India, 9 pages.

Ericsson, "S2-1901721: Mapping of bridge port and QoS control in 5GS," 3GPP TSG-SA WG2 Meeting #131, Change Request, Feb. 25-Mar. 1, 2019, Santa Cruz, Spain, 7 pages.

Ericsson, "S2-1903375: TSN-5GS QoS mapping partly at AF and PCF," Third Generation Partnership Project (3GPP), TSG-SA WG2 Meeting #132, Apr. 8-12, 2019, Xi'an, China, 7 pages.

Kentis, Angelos Mimidis, et al., "Effects of Port Congestion in the Gate Control List Scheduling of Time Sensitive Networks," 8th International Conference on the Network of the Future (NOF), IEEE, 2017, pp. 138-140.

Nokia, et al., "R2-1817270: NR support for TSN traffic patterns," Third Generation Partnership Project (3GPP), TSG-RAN WG2 Meeting #104, Nov. 12-16, 2018, Spokane, USA, 9 pages.

Siemens AG et al., "S1-183120: cyberCAV—5G in Industrial Automation: Different and Multiple Time Domains for Synchronization," 3GPP TSG-SA WG1 Meeting #84, Nov. 12-16, 2018, Spokane, Washington, 8 pages.

Invitation to Pay Additional Fees and Partial Search for International Patent Application No. PCT/IB2020/050181, mailed Apr. 1, 2020, 14 pages.

International Search Report and Written Opinion for International Patent Application No. PCT/IB2020/050181, mailed May 18, 2020, 28 pages.

Invitation to Pay Additional Fees and Partial Search for International Patent Application No. PCT/IB2020/051264, mailed May 8, 2020, 7 pages.

International Search Report and Written Opinion for International Patent Application No. PCT/IB2020/051264, mailed Jun. 30, 2020, 16 pages.

Ericsson, "C3-182188: QoS parameter mapping in PCF," 3GPP TSG-CT WG3 Meeting #96, Apr. 16-20, 2018, Kunming, China, 8 pages.

LG Electronics, "S2-1810280: Discussion on QoS in MA-PDU," 3GPP TSG-SA WG2 Meeting #129, Oct. 15-19, 2018, Dongguan, China, 9 pages.

Nokia, et al., "S2-1811209: TSN-QoS Framework," 3GPP SA WG2 Meeting #129, Oct. 15-19, 2018, Dongguan, China, 12 pages.

Examination Report for European Patent Application No. 20702358.1, mailed Dec. 13, 2022, 9 pages.

Notice of Reasons for Rejection for Japanese Patent Application No. 2021-571531, mailed Jan. 24, 2023, 8 pages.

Advisory Action for U.S. Appl. No. 17/431,202, mailed Dec. 23, 2022, 4 pages.

Non-Final Office Action for U.S. Appl. No. 17/863,645, mailed Jan. 10, 2023, 21 pages.

Final Office Action for U.S. Appl. No. 17/431,202, mailed Sep. 23, 2022, 16 pages.

Second Office Action for Chinese Patent Application No. 202080014340.3, mailed Jun. 28, 2022, 7 pages.

Examination Report for European Patent Application No. 20708642.2, mailed Jun. 9, 2022, 7 pages.

Craciunas, "Scheduling Real-Time Communications in IEEE 802.1Qbv Time Sensitive Networks," 24th International Conference on Real-Time Networks and Systems, Oct. 2016, pp. 183-192.

Non-Final Office Action for U.S. Appl. No. 17/422,496, mailed Jun. 29, 2023, 11 pages.

Notice of Allowance for U.S. Appl. No. 17/863,645, mailed Jul. 20, 2023, 8 pages.

Non-Final Office Action for U.S. Appl. No. 18/106,761, mailed Jul. 19, 2023, 19 pages.

Examination Report for European Patent Application No. 19809637.2, mailed Jun. 23, 2023, 8 pages.

Final Office Action for U.S. Appl. No. 17/422,496, mailed Dec. 1, 2023, 10 pages.

Notice of Non-Compliant Amendment for U.S. Appl. No. 18/106,761, mailed Oct. 30, 2023, 4 pages.

Notice of Allowance for U.S. Appl. No. 18/106,761, mailed Jan. 24, 2024, 8 pages.

Non-Final Office Action for U.S. Appl. No. 17/616,139, mailed Jan. 4, 2024, 15 pages.

Non-Final Office Action for U.S. Appl. No. 17/431,202, mailed Feb. 9, 2022, 19 pages.

Huawei, et al., "S2-1811021: QoS Negotiation between 3GPP and TSN networks KI#3.1," 3GPP SA WG2 Meeting #129, Oct. 15-19, 2018, Dongguan, China, 9 pages.

Intention to Grant for European Patent Application No. 20726558.8, mailed May 10, 2024, 50 pages.

Final Office Action for U.S. Appl. No. 17/616,139, mailed Jul. 9, 2024, 18 pages.

* cited by examiner

OUTPUT PACING IN A CELLULAR COMMUNICATIONS SYSTEM SERVING AS A TIME-SENSITIVE NETWORKING (TSN) NODE

RELATED APPLICATIONS

This application is a 35 U.S.C. § 371 national phase filing of International Application No. PCT/IB2019/059942, filed Nov. 19, 2019, which claims the benefit of provisional patent application Ser. No. 62/769,372, filed Nov. 19, 2018, the disclosures of which are hereby incorporated herein by reference in their entireties.

TECHNICAL FIELD

The present disclosure relates to integration of a cellular communications system (e.g., a Fifth Generation (5G) system) and a Time-Sensitive Networking (TSN) network.

BACKGROUND

The manufacturing industry is undergoing a digital transformation towards the "Fourth Industrial Revolution" (Industry 4.0) [1] and smart manufacturing. Flexible connectivity infrastructure is a key enabler for manufacturing to interconnect machines, products, and all kinds of other devices in a flexible, secure, and consistent manner.

The Third Generation Partnership Project (3GPP) Fifth Generation (5G) system, as an alternative to or complementing the wired connectivity solution, should support new requirements and challenges coming from these vertical domains. 3GPP has a study on Communication for Automation in Vertical Domains (Technical Report (TR) 22.804), where many use cases from vertical domains are analyzed. Industrial automation applications, such as motion control, have extremely stringent service requirements on high availability, ultra-reliable, low latency, low jitter, and determinism, e.g., 1-10 milliseconds (ms) end-to-end latency and 1-100 microsecond (µs) packet delay variation [2].

Today, wireline fieldbus solutions such as PROFINET®, EtherCAT®, and Ethernet/Internet Protocol (IP) are mostly used on the factory shop floor to interconnect sensors, actuators, and controllers in an automation system. Institute of Electrical and Electronics Engineers (IEEE) 802.1 Time-Sensitive Networking (TSN) as a novel technology will be able to provide manufacturing industries with deterministic, guaranteed latencies and extremely low packet loss services through standard IEEE 802 networks in the near future.

One of the IEEE 802.1 TSN standards, 802.1Qbv, can provide on-time delivery of TSN frames. It defines a means to transmit certain Ethernet frames on a time-based schedule. IEEE 802.1Qbv requires time synchronization, i.e., each bridge has to be aware of the same time.

FIG. 1 shows an example of a TSN setup 100. An industrial controller 102 on the right-hand side of the figure and a robot 104 on the left-hand side of the figure are called end stations that are connected through several TSN bridges 106. The TSN network can be configured in different ways. In a static configuration, the end stations 102 and 104 and the TSN bridges 106 are configured during network set-up. In a centralized network configuration set-up, all configurations of TSN bridges 106 for TSN streams are performed by a Centralized Network Configuration (CNC) station 108, which configures the network resource reservations and is responsible for coordinating any changes to those configured reservations with any new reservations. Reservations can be made or requested by end stations. In a fully centralized set-up where both the network and the user configuration are centralized, the CNC station 108 receives the requirements of the data flows from a Central User Configuration (CUC) entity 110 and then computes the route and the time schedules needed for the end-to-end transmission for each TSN flow, and configures the TSN bridges 106 with the computed time schedule.

Currently, there is a desire to integrate the 5G system with a TSN network. Doing so creates new challenges for the 5G system that need to be addressed.

SUMMARY

Systems and methods are disclosed herein for output pacing in a cellular communications system that serves as a virtual Time-Sensitive Networking (TSN) node in a TSN network. Embodiments of a method of operation of a boundary node and corresponding embodiments of a boundary node are disclosed. In some embodiments, a method of operation of a boundary node associated with a cellular communications system that operates as a virtual TSN node in a TSN network comprises receiving user plane traffic from a node in the cellular communications system. The user plane traffic is user plane traffic received by the cellular communications system from a previous hop TSN node. The method further comprises performing output pacing for the user plane traffic when outputting the user plane traffic to a next hop TSN node such that the user plane traffic is output to the next hop TSN node at a rate that matches a desired rate at the next hop TSN node.

In some embodiments, the boundary node is a User Equipment (UE). Receiving the user plane traffic from the node comprises receiving the user plane traffic from a base station, and performing output pacing for the user plane traffic comprises performing output pacing for the user plane traffic when outputting the user plane traffic from the UE to the next hop TSN node. In some embodiments, both the UE and the base station are part of the cellular communications system that operates as the virtual TSN node. In some other embodiments, the UE is part of a first virtual TSN node, and the base station is part of the virtual TSN node. In some embodiments, both the UE and the base station are part of a first virtual TSN node that is separate from the virtual TSN node.

In some embodiments, the boundary node is a UE that is part of a first virtual TSN bridge. Receiving the user plane traffic from the node comprises receiving the user plane traffic from a previous hop TSN node, and performing output pacing for the user plane traffic comprises performing output pacing for the user plane traffic when outputting the user plane traffic via an uplink from the UE to a base station that is part of the virtual TSN node.

In some embodiments, the boundary node is a node that: (a) is separate from but connected to a UE that is in the cellular communications system and (b) implements an adaptor or translator function that performs output pacing. Receiving the user plane traffic from the node comprises receiving the user plane traffic from the UE, and performing output pacing for the user plane traffic comprises performing output pacing for the user plane traffic when outputting the user plane traffic from the node to the next hop TSN node.

In some embodiments, the boundary node is a User Plane Function (UPF) in a core network of the cellular communications system that serves as the virtual TSN node. Receiving the user plane traffic from the node comprises receiving the user plane traffic from a base station, and performing output pacing for the user plane traffic comprises performing output pacing for the user plane traffic when outputting the user plane traffic from the UPF to the next hop TSN node. In some embodiments, both the UPF and the base station are part of the virtual TSN node. In some other embodiments, the UPF is part of the virtual TSN node, and the base station is part of another virtual TSN node that is a previous hop TSN node.

In some embodiments, the boundary node is a UPF in a core network of the cellular communications system that serves as the virtual TSN node. Receiving the user plane traffic from the node comprises receiving the user plane traffic from a previous hop TSN node, and performing output pacing for the user plane traffic comprises performing output pacing for the user plane traffic when outputting the user plane traffic from the UPF to a base station that is part of another virtual TSN node that is a next hop TSN node.

In some embodiments, the boundary node is a node that: (a) is separate from but connected to a UPF in a core network of the cellular communications system and (b) implements an adaptor or translator function that performs output pacing.

In some embodiments, the boundary node is a base station in the cellular communications system that serves as the virtual TSN bridge. Receiving the user plane traffic comprises receiving the user plane traffic from a UPF that is in a core network of the cellular communications system that serves as the virtual TSN bridge, and performing output pacing for the user plane traffic comprises performing output pacing for the user plane traffic when outputting the user plane traffic from the base station to a UE via a downlink, where the UE is part of a second virtual TSN node that is the next hop TSN node.

In some embodiments, the boundary node is a base station that is part of another virtual TSN node that is separate from the virtual TSN bridge provided by the cellular communications system. Receiving the user plane traffic comprises receiving the user plane traffic via an uplink from a UE, and performing output pacing for the user plane traffic comprises performing output pacing for the user plane traffic when outputting the user plane traffic from the base station to a UPF that is in a core network of the cellular communications system that serves as the virtual TSN bridge.

In some embodiments, the desired rate at the next hop TSN node is the same as a rate at which the incoming user plane traffic was received from the previous hop TSN node.

In some embodiments, the user plane traffic is associated with a Quality of Service (QoS) flow that is mapped to a particular TSN flow in the TSN network, and the desired rate at the next hop TSN node is a desired rate at the next hop TSN node for the particular TSN flow.

In some embodiments, a boundary node associated with a cellular communications system that operates as a virtual TSN node in a TSN network is adapted to receive user plane traffic from a node in the cellular communications system. The user plane traffic is user plane traffic received by the cellular communications system from a previous hop TSN node. The boundary node is further adapted to perform output pacing for the user plane traffic when outputting the user plane traffic to a next hop TSN node such that the user plane traffic is output to the next hop TSN node at a rate that matches a desired rate at the next hop TSN node.

In some embodiments, a boundary node associated with a cellular communications system that operates as a virtual TSN node in a TSN network comprises at least one receiver or a network interface and processing circuitry associated with the at least one receiver or the network interface. The processing circuitry is configured to cause the boundary node to receive user plane traffic from a node in the cellular communications system. The user plane traffic is user plane traffic received by the cellular communications system from a previous hop TSN node. The processing circuitry is further configured to cause the boundary node to perform output pacing for the user plane traffic when outputting the user plane traffic to a next hop TSN node such that the user plane traffic is output to the next hop TSN node at a rate that matches a desired rate at the next hop TSN node.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
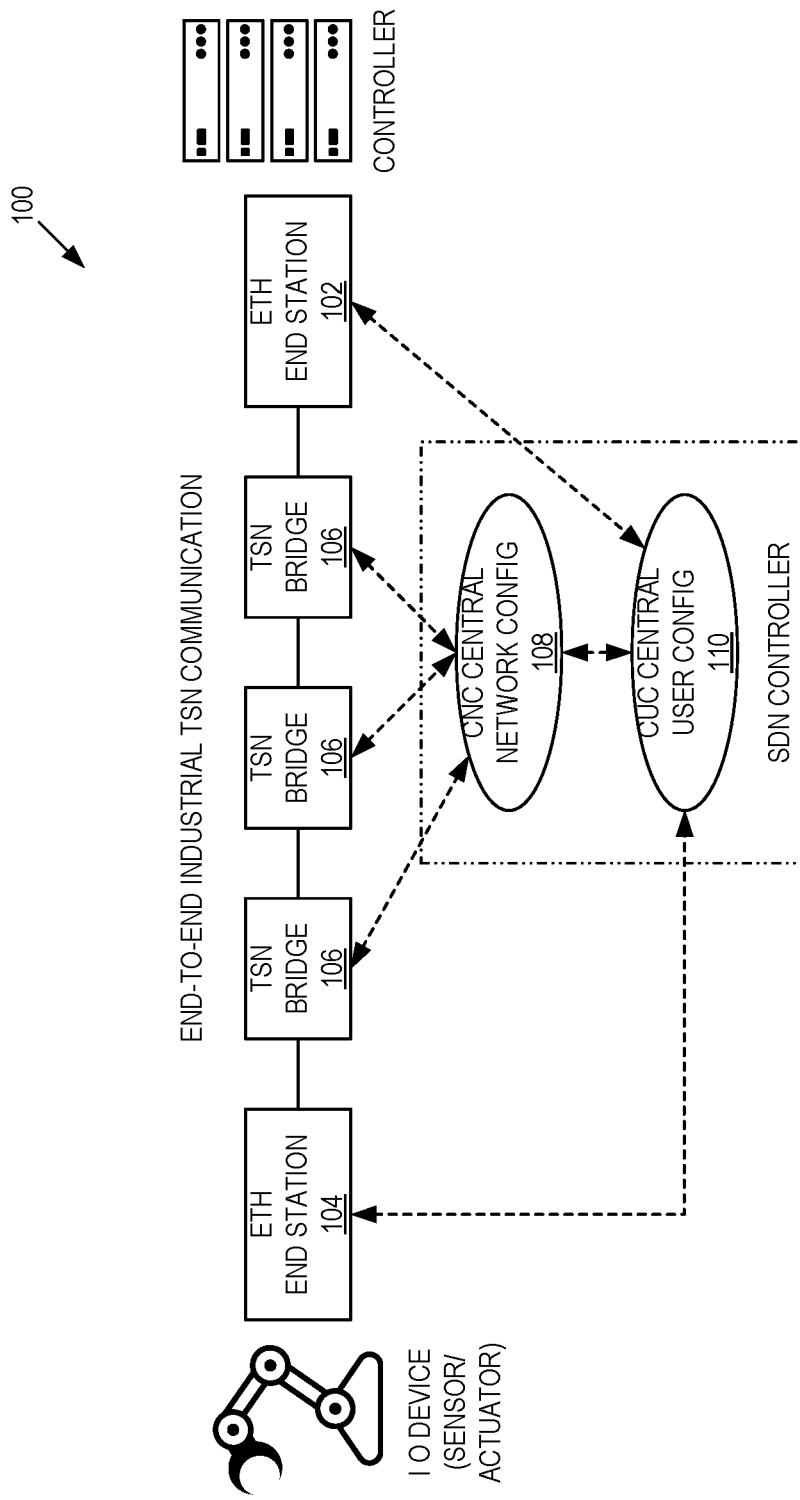
FIG. 1 shows an example of a Time-Sensitive Networking (TSN) network.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (PGW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that while embodiments described herein focus on a 5G system, the present disclosure is not limited to the use of a 5G system. Any suitable cellular or mobile communications system may be used.

When considering the integration of the 5G system with a Time-Sensitive Networking (TSN) network, a first problem is that burst traffic from a 5G system may overflow the buffer in the next hop TSN node. More specifically, today, wireless communication is primarily used for non-critical applications. Most existing wireless technologies cannot fulfill the demanding requirements of industrial applications, especially with respect to end-to-end latency and reliability (packet loss). If a 5G system wants to be a candidate for providing connectivity services for factory automation, the 5G system should be able to be integrated with an industrial TSN network. 3GPP Release 16 has an ongoing study on the integration between a 5G system and TSN [3], [4].

Burstiness in one of the network nodes can lead to forwarding delays in the node and may even spread the delay to other nodes. Burstiness can cause overflow buffers at the subsequent bridges, and thereby lead to congestion loss.

In a TSN bridged network supporting Institute of Electrical and Electronics Engineers (IEEE) 802.1Qbv, in order to achieve determinism and low latency, all nodes are synchronized and time scheduled. The forwarding delay at each bridge port normally can be controlled within a given bound, e.g., below 100 microseconds (µs), which means their buffer sizes are normally configured to store a limited number of frames/packets. However, the mobile system currently has large latency variations. For example, latency ranges from 330 µs to 4100 µs in the uplink and 330 µs to 2200 µs in downlink, which is much larger and varies more than the normal TSN network nodes. When a 5G System (5GS) is integrated with a TSN network, if there is no proper congestion and flow control mechanism applied, the traffic coming out of the 5GS will become bursts for the next TSN bridges or end stations and thereby overflow the buffer in the TSN nodes and lead to congestion losses.

A second problem is that of conveying TSN information in a 5GS. More specifically, the traffic in the TSN network can have mixed service profiles or TSN flows, i.e. different Quality of Service (QoS) requirements. Each TSN flow has a unique identifier which is used by the TSN bridges to differentiate one TSN flow from another. However, it is still an open question about how to adapt those TSN flows and their requirements, e.g. the Priority Code Point (PCP) value encoding the traffic class for QoS, spacing in time, into a 3GPP system.

Certain aspects of the present disclosure and their embodiments may provide solutions to the aforementioned or other challenges.

Embodiments of the present disclosure provide an output pacing mechanism at the boundary between a 5GS and an Ethernet (e.g., TSN) network. Depending on traffic direction, the output pacing mechanism can be implemented, for example, at the UE for downlink traffic (e.g., from a Programmable Logic Controller (PLC) to a robot) and at the UPF for uplink traffic (e.g., from a robot to a PLC). In some embodiments, the 5GS first learns information from the TSN Centralized Network Configuration (CNC) station and/or Central User Configuration (CUC) entity and/or determines the TSN information by examining incoming packets/frames from the previous hop TSN node. This information includes information regarding different flows (referred to herein as TSN flows) used in the TSN network and information regarding the pattern of user plane traffic (e.g., critical user plane traffic) in the TSN network, e.g., for each TSN flow. The information obtained or determined by the 5GS may include, e.g., frames/packets pacing, buffer size, and TSN flow PCPs. Using this information, the 5GS implements a pacing mechanism at the boundary between the 5GS and the TSN network. For example, in some embodiments, output buffers and pacing control are introduced to the 5GS at the boundary of the 5GS (e.g., the UE or UPF). The output pacing can be configured by the CNC/5G Operations Support System (OSS)/core network control plane functions in such a manner that the user plane traffic is output from the 5GS at the same rate as expected by the subsequent TSN nodes, thereby avoiding overloading the subsequent TSN nodes. By pacing the delivery of frames/packets, congestion delay and congestion loss can be eliminated.

In some embodiments, a method for output buffering with data pacing at the boundary of a 5GS (e.g., at a UE and/or a UPF) is provided, where the output from the 5GS can operate at the same pace as other TSN nodes in the TSN network (e.g., in the IEEE 802.1Qbv network). In this manner, zero congestion delay and loss can be realized. In some embodiments, the method comprises:

learning, by the 5GS, (e.g., from the CNC and/or CUC or by examining incoming traffic from the previous hop TSN node) a pattern(s) of the traffic from the previous hop TSN node (e.g., the spacing of incoming frames/packets), e.g., for one or more TSN flows;

learning, by the 5GS, (e.g., from the CNC and/or CUC or by examining incoming traffic from the previous hop TSN node (e.g., by examining Virtual Local Area Network (VLAN) flags and/or traffic class headers of the incoming frames/packets) information regarding one or more TSN flows and corresponding traffic classes received from the previous hop TSN node;

performing, at a boundary node (e.g., UE or UPF) of the 5GS, output pacing for traffic output to a next hop TSN node (e.g., based on the learned pattern(s) of traffic flow, e.g., for the one or more TSN flow(s)). For example, the boundary node assigns an output buffer and an on/off pacing gate for each TSN flow or for each TSN flow that is associated with a high priority traffic class. The output pacing may be performed at a pacing rate that is configured to match an expected rate (e.g., spacing of outgoing frames/packets) at the next hop TSN node.

Certain embodiments may provide one or more of the following technical advantage(s). For example, output pacing by the 5GS may provide any one or more of the following advantages:

Output pacing avoids burst traffic coming out from the 5GS to overflow the buffers at subsequent TSN nodes.

Output pacing is an enabler for 5GS-TSN integration.

Output pacing at the 5GS is adapted to setting of TSN bridges/end stations. The TSN nodes and 5GS are coordinated through the CNC and/or CUC. It can be reconfigured together with the rest of the TSN bridges/end stations in order to match the needs from applications.

Embodiments of the present disclosure provide a solution on how the 5GS can adapt TSN information from the CUC/CNC or preceding TSN nodes and then use that information to configure the 5GS acting as a TSN bridge.

Figure 2:
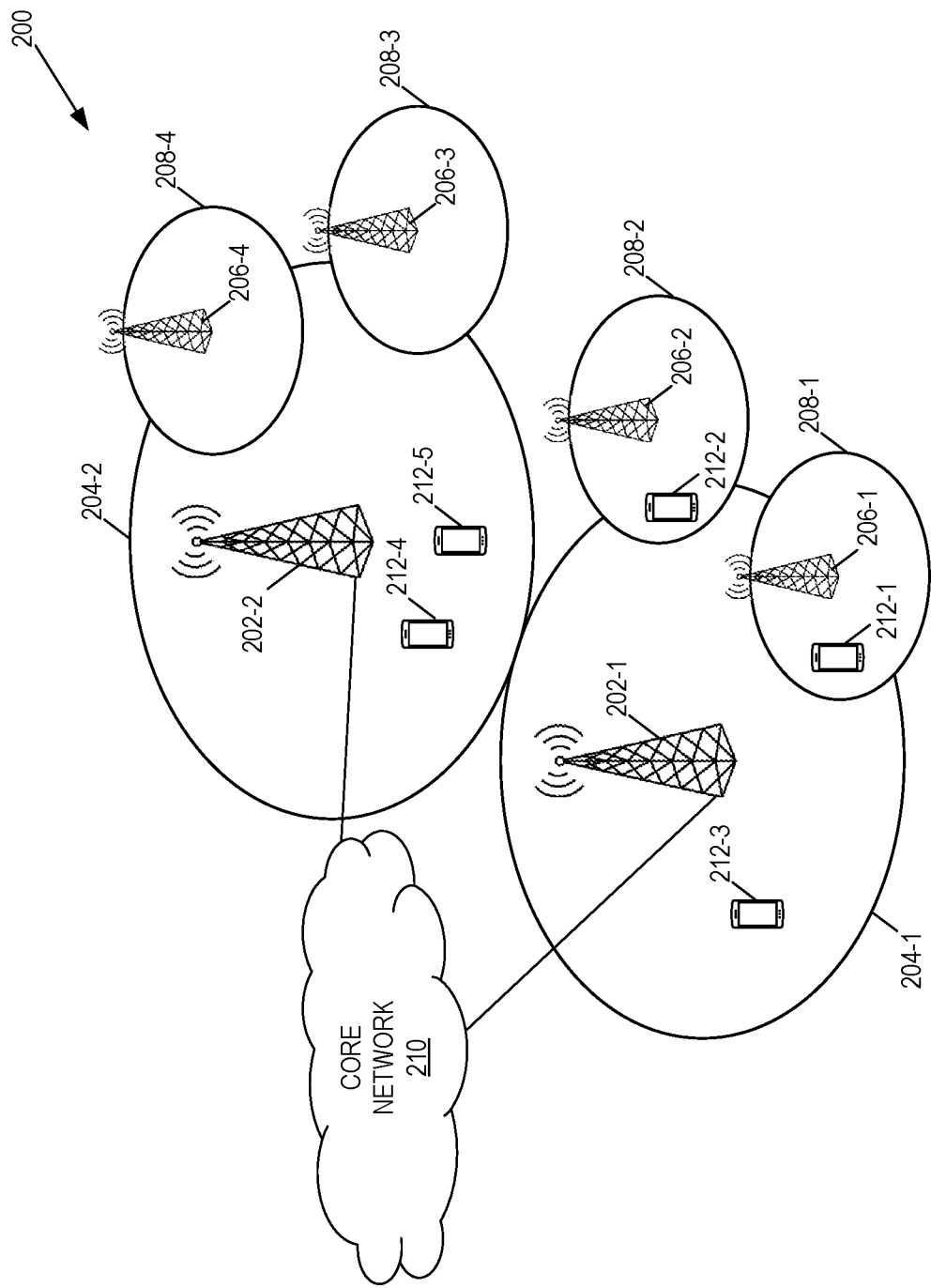
FIG. 2 illustrates one example of a cellular communications network according to some embodiments of the present disclosure.

Before describing embodiments of the present disclosure in more detail, a brief discussion of a 5GS is beneficial. In this regard, FIG. 2 illustrates one example of a cellular communications network 200 according to some embodiments of the present disclosure. In the embodiments described herein, the cellular communications network 200 is a 5G NR network. In this example, the cellular communications network 200 includes base stations 202-1 and 202-2, which in 5G NR are referred to as gNBs, controlling corresponding macro cells 204-1 and 204-2. The base stations 202-1 and 202-2 are generally referred to herein collectively as base stations 202 and individually as base station 202. Likewise, the macro cells 204-1 and 204-2 are generally referred to herein collectively as macro cells 204 and individually as macro cell 204. The cellular communications network 200 may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The base stations 202 (and optionally the low power nodes 206) are connected to a core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

Figure 3:
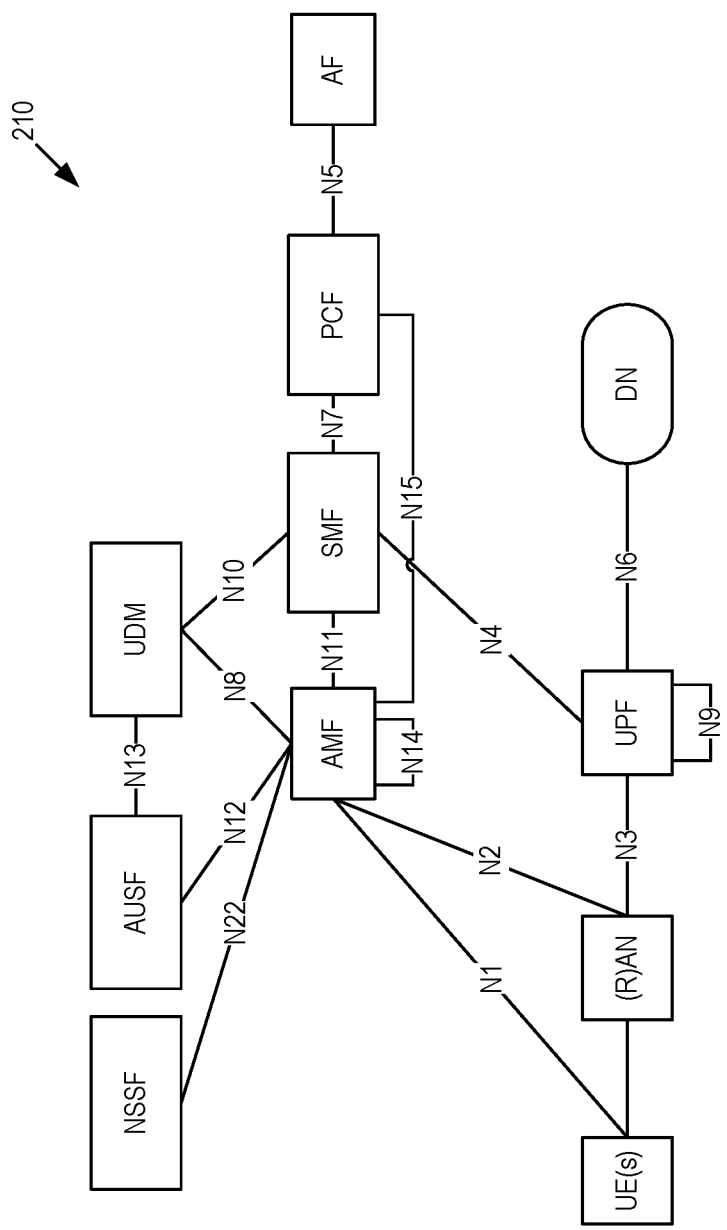
FIGS. 3 and 4 illustrate a wireless communication system represented as a Fifth Generation (5G) network architecture.

FIG. 3 illustrates a wireless communication system represented as a 5G network architecture composed of core Network Functions (NFs), where interaction between any two NFs is represented by a point-to-point reference point/interface. FIG. 3 can be viewed as one particular implementation of the system 200 of FIG. 2.

Seen from the access side the 5G network architecture shown in FIG. 3 comprises a plurality of UEs connected to either a Radio Access Network (RAN) or an Access Network (AN) as well as an AMF. Typically, the R(AN) comprises base stations, e.g. such as eNBs or gNBs or similar. Seen from the core network side, the 5G core NFs shown in FIG. 3 include an NSSF, an AUSF, a UDM, an AMF, a SMF, a PCF, and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 3, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 3. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 4:
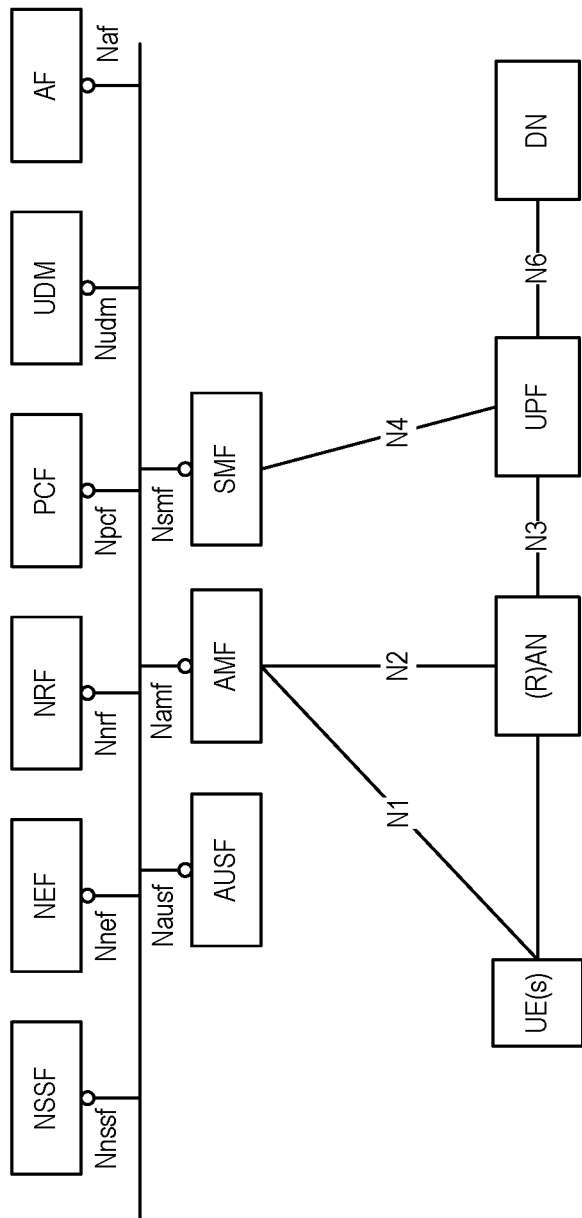

FIG. 4 illustrates a 5G network architecture using service-based interfaces between the NFs in the control plane, instead of the point-to-point reference points/interfaces used in the 5G network architecture of FIG. 3. However, the NFs described above with reference to FIG. 3 correspond to the NFs shown in FIG. 4. The service(s) etc. that a NF provides to other authorized NFs can be exposed to the authorized NFs through the service-based interface. In FIG. 4 the service based interfaces are indicated by the letter "N" followed by the name of the NF, e.g. Namf for the service based interface of the AMF and Nsmf for the service based interface of the SMF etc. The NEF and the NRF in FIG. 4 are not shown in FIG. 3 discussed above. However, it should be clarified that all NFs depicted in FIG. 3 can interact with the NEF and the NRF of FIG. 4 as necessary, though not explicitly indicated in FIG. 3.

Some properties of the NFs shown in FIGS. 3 and 4 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support QoS. Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 5:
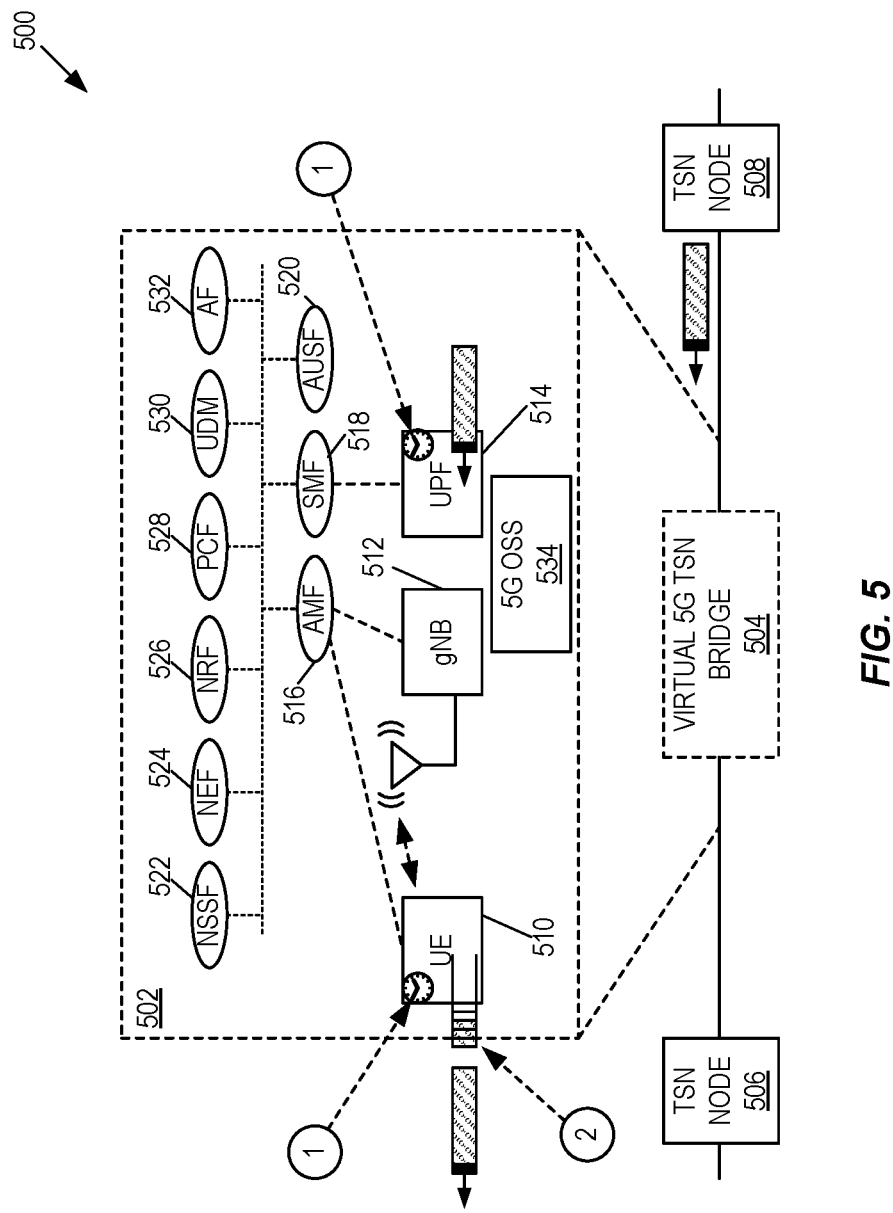
FIG. 5 illustrates a TSN network in which a 5G system is integrated into the TSN network as a virtual 5G TSN bridge and output pacing is provided at a boundary node for downlink traffic in accordance with one embodiment of the present disclosure.

Now, turning to some example embodiments of the present disclosure. FIG. 5 illustrates a TSN network 500 in which a 5GS 502 is integrated into the TSN network 500 as a virtual 5G TSN bridge 504. The virtual 5G TSN bridge 504 operates as a TSN bridge between two TSN nodes 506 and 508. In other words, the 5GS 502 operates as a TSN bridge between the TSN nodes 506 and 508. The TSN node 506 may be another TSN bridge or an end point. Likewise, the TSN node 508 may be another TSN bridge or an end point.

As illustrated, the 5GS 502 includes a UE 510, a gNB 512, and a number of core network entities, which in this example include a UPF 514, an AMF 516, an SMF 518, an AUSF 520, an NSSF 522, an NEF 524, an NRF 526, a PCF 528, a UDM 530, and an AF 532. The 5GS 502 also includes a 5G OSS 534. The UE 510 is shown separately from the TSN node 506. However, in some embodiments, the UE 510 is integrated into the TSN node 506 (i.e., the UE 510 is part of the TSN node 506). In some other embodiments, the UE 510 is separate from the TSN node 506 and is connected to the TSN node 506 via some deterministic wired or wireless connection. The TSN node 508 is connected to the 5GS 502 via a deterministic wired or wireless connection.

In the example of FIG. 5, the 5GS 502 provides output pacing at a boundary of the 5GS 502 in the downlink direction. In other words, in this example, the direction of traffic in the TSN network 500 corresponds to the downlink direction in the 5GS 502 and, in this case, the UE 510 is the boundary of the 5GS 502 and, as such, the UE 510 provides an output packing mechanism.

In this example, output pacing is performed at the UE 510 in the downlink direction as follows. Note that the numerals illustrated in FIG. 5 correspond to the numerals in the list below.

1. To be able to adjust the output pacing at boundary of the 5GS 502 (e.g., at the UE 510 in the example of FIG. 5) in the same pace as the subsequent TSN node(s) 506, nodes (e.g., UE 510, gNB 512, and UPF 514) inside the 5GS 502 need to be synchronized. The reference clock (grandmaster) in the 5GS 502 should be aligned with the reference clock in the TSN network 500 (i.e., aligned with the reference clock used by the other TSN nodes 506 and 508). That is, the reference clock in the 5GS 502 and the reference clock in the TSN network 500 have the same notion of time and level accuracy so that these reference clocks do not go off from each other. In some embodiments, the reference clock of the 5GS 502 can even be the same as the one used by TSN network 500. The time synchronization can be implemented, e.g., using 802.1AS or other IEEE 1588 profiles.

2. The 5GS 502 learns the pattern of time critical traffic (i.e., time critical user plane traffic) transmitted by the previous hop TSN node 508. Any learning mechanism may be used. Two examples are given below and are referred to herein as option (a) and option (b). In general, in option (a), the 5GS 502 obtains information from the CNC and/or CUC of the TSN network 500 regarding the pattern of time critical traffic, preferably on a per TSN flow basis. This information may include, for example, the size of the traffic (e.g., the size of the packets/frames), the time period (e.g., the time period or duration of the packets/frames), and/or the time gap between the packets/frames, as explained below in more detail. In option (b), the 5GS 502 learns information regarding the pattern of time critical traffic transmitted by the previous hop TSN node 508, preferably on a per TSN flow basis, by examining the frames/packets arriving at the 5G user plane node(s) (e.g., the UPF 514) from the previous hop TSN node 508, as explained below in more detail.

a. In option (a), the CUC and/or CNC of the TSN network 500 sends information (also referred to herein as TSN information) to the control plane of the 5GS 502. This information may be sent to the control plane of the 5GS 502 (e.g., to the AF 532, to the PCF 528, to the SMF 518, or to some other control plane node) directly from the CUC and/or the CNC or via a translator function (e.g., implemented in an AF) that translates CNC and/or CUC specific terminologies to 3GPP compatible mechanism or terminologies. Within the 5GS 502, the UPF 514 receives the TSN information via, for example, the 3GPP signal Protocol Data Unit (PDU) session establishment/modification procedure. The UE 510 can receive the TSN information via, e.g., Non-Access Stratum (NAS) signaling at registration or configuration update.

b. In option (b), the UPF 514 detects the incoming frames/packets from the previous hop TSN node 508 and, from the detected incoming frames/packets, learns the pattern of time critical traffic incoming from the TSN node 508. In other words, the UPF 514 uses the detected incoming frames/packets to learn the TSN information. The UPF 514 sends the TSN information to the UE 510, e.g., via the SMF 518 and the AMF 516. For example, the UPF 514 may inform the SMF 518 of the TSN information or some parameter(s) derived therefrom (e.g., pacing rate), where the SMF 518 sends the TSN information or derived parameter(s) to the AMF 516 and the AMF 516 sends the TSN information or derived parameter(s) to the UE 510 using a configuration update (e.g., pacing rate).

3. The traffic in the TSN network 500 can have different QoS requirements, hence different priorities. A 3-bit field PCP in the Ethernet header is used to define the traffic class of TSN flows (up to eight different traffic classes), which corresponds to a maximum of eight queues in the TSN bridges of a bridged network. When there are multiple incoming TSN flows to the 5GS 502, the 5GS 502 can learn the flow information (e.g., PCP values, traffic classes), for example, via option (a) or option (b) below. It should be noted that, in some embodiments, the 5GS 502 learns the traffic pattern for each TSN flow, in which case the 5GS 502 may learn the TSN flows before learning the traffic patterns for those TSN flows.

a. In option (a), the 5GS 502 first learns number of TSN flows and traffic classes from the CNC and/or CUC (e.g., the 5GS 502 receives information from the CNC and/or CUC that indicates the TSN flows and the associated traffic classes). Then, the 5GS 502 maps those TSN flows belonging to different traffic classes to different 5GS QoS flows [REF: Technical Specification (TS) 23.501, clause 5.7.1]. Within the 5GS 502, QoS flows may be configured in the UPF 514, e.g., by the SMF 518 using the PDU session establishment/modification procedure. Note that, as an example, the learning of the TSN flows from the CNC and/or CUC and the mapping of the TSN flows to 5G QoS flows is performed via a control plane entity(ies) such as, e.g., the AF 532, the PCF 528, and/or the SMF 518.

b. In option (b), the UPF 514 in the 5GS 502 examines VLAN tags and/or PCP values from the Ethernet frame headers of incoming Ethernet frames, thereby obtaining information regarding the TSN flows. After this, the UPF 514 sends the flow information to the UE 510; e.g., the UPF 514 can pass the flow information to the SMF 518 via event notification, and the SMF 518 configures QoS flows in the 5GS 502 by applying a 1:1 mapping between different TSN flows and different 5G QoS flows. QoS configuration may be performed using the existing procedures such as, e.g., PDU session establishment or modification.

4. The UE 510 conducts pacing on the outgoing (user plane) traffic towards the next TSN node(s) 506. In some embodiments, all incoming TSN flows (from previous TSN node(s) 508 to the 5GS 502), or at least those TSN flows having high priority in the TSN network 500, are associated with a corresponding output buffer at the UE 510 with data pacing, e.g., according to the specification of CNC and/or CUC. In other words, for each TSN flow, the corresponding user plane traffic is output from the UE 510 at a pace that is aligned with the pace desired in the TSN network 500 (e.g., at the same pace as the pace learned from the CNC and/or CUC or learned by examining incoming frames/packets from the previous hop TSN node 508). In such a way, the subsequent TSN node(s) 506 (e.g., bridges/end stations) will receive the frames/packets from the UE 510 in the same pace as desired in the TSN network 500, thereby achieving zero congestion loss. An example of implementation could be:

The UE 510 has several outgoing buffers and on/off gates (performing pacing). The number of buffers and gates can be the same as the number of TSN traffic classes (distinguished with different PCP values) that the 5GS 502 received from the previous TSN node 508. Alternatively, the number of output pacing buffers and gates can be only implemented for a few higher priority TSN flows. All pacing gates are synced with the TSN network 500. When the UE 510 is sending frames/packets to the subsequent TSN node(s) 506 (e.g., subsequent bridges/end stations), the UE 510 preserves the spacing in time between the packets/frames on the outgoing port. This can be done even when the outgoing port is an aggregation port operating at a higher rate.

Figure 6:
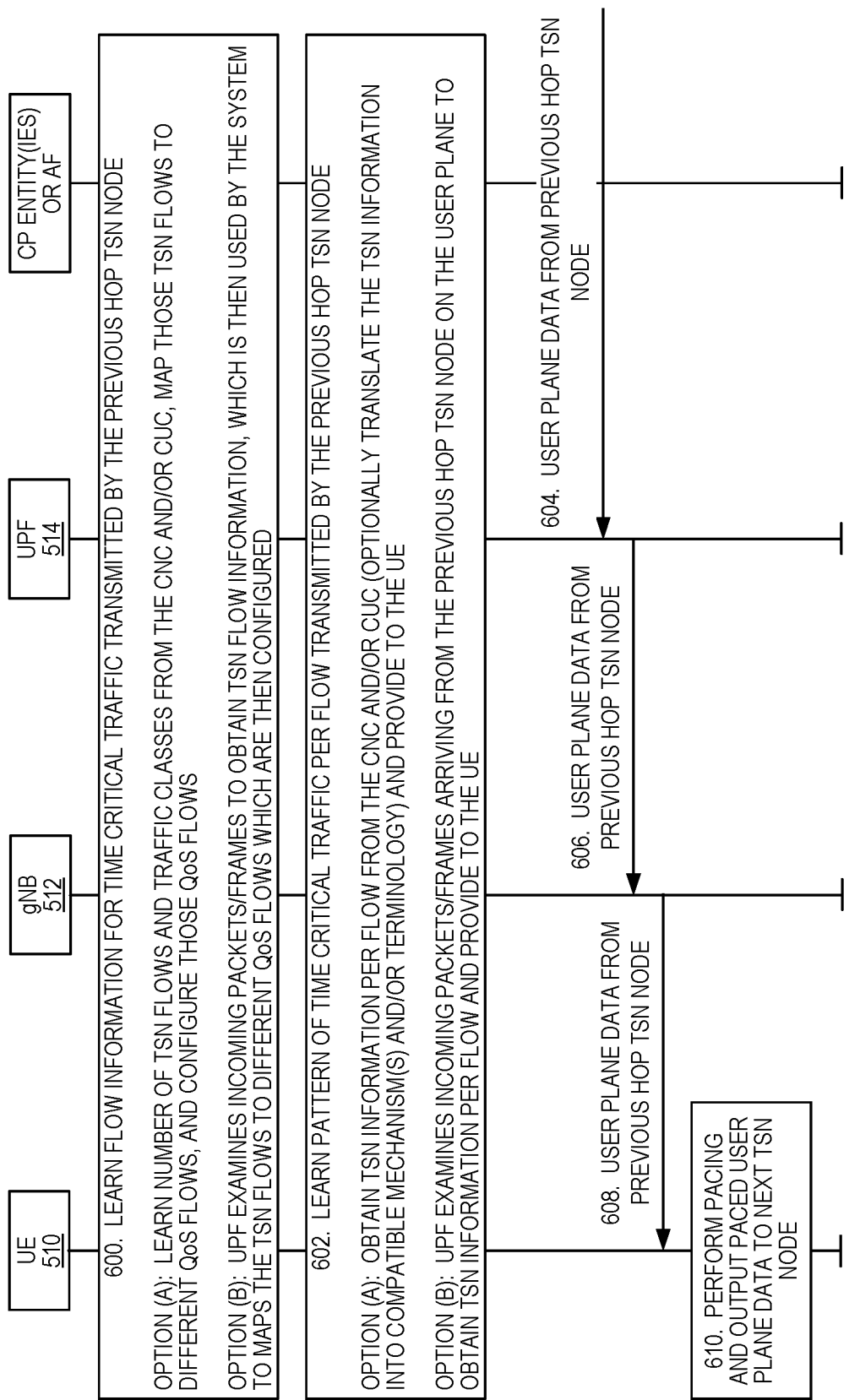
FIG. 6 illustrates the operation of the 5G system of FIG. 5 in accordance with one embodiment of the present disclosure.

The operation of the 5GS 502 for the example of FIG. 5 is illustrated in FIG. 6. As illustrated, the 5G system 502 learns flow information for time critical traffic received from the previous hop TSN node(s) 508 (step 600). The details of this step are given above along with two example options with respect to #3 in the list above. The 5GS 502 also learns patterns of the time critical traffic received from the previous hop TSN node(s) 508 (step 602). The details of this step are given above along with two example options with respect to #2 in the list above. Note that steps 600 and 602 may be performed in any suitable order or performed in parallel. Then, when incoming (user plane) traffic is received at the UPF 514 from the previous hop TSN node 508, the UPF 514 sends the traffic to the gNB 512, which transmits the traffic to the UE 510 (steps 604-608). The UE 510 performs output pacing of the traffic when providing the traffic to the next TSN node 506 (step 610). The details of this step are given above along with two example options with respect to #4 in the list above.

Figure 7:
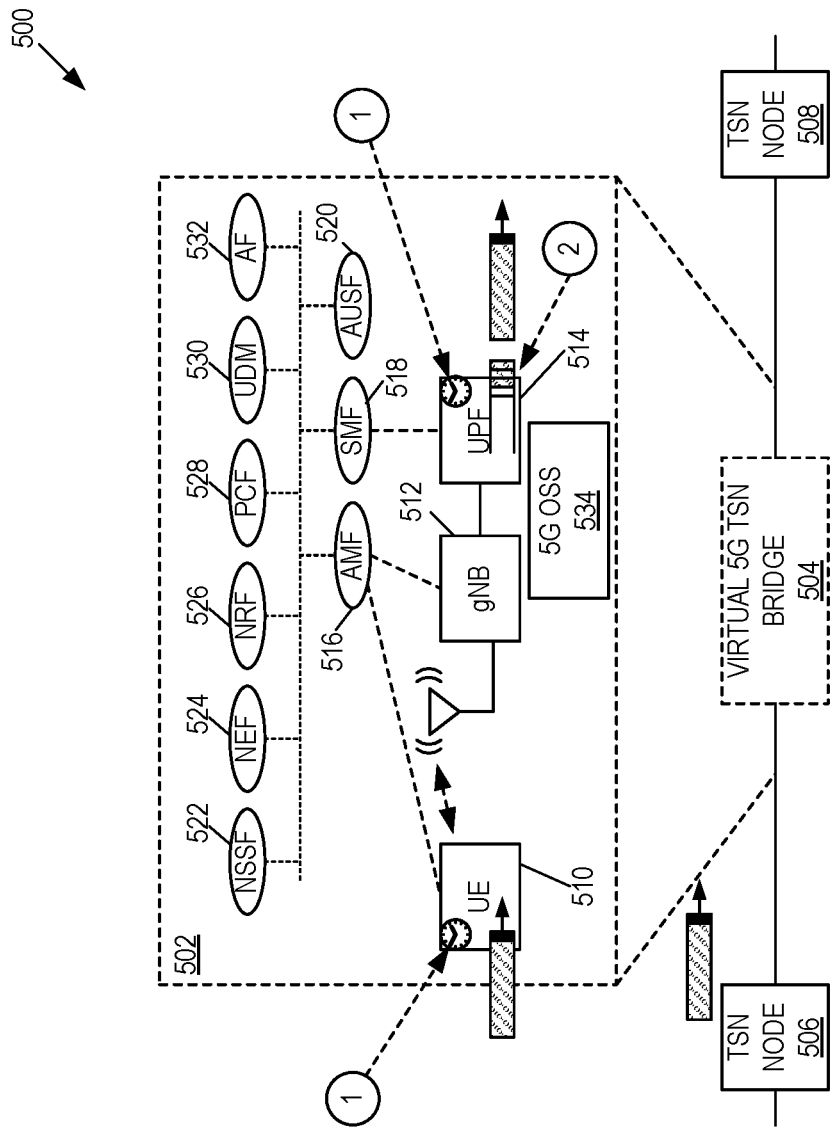
FIG. 7 illustrates a TSN network in which a 5G system is integrated into the TSN network as a virtual 5G TSN bridge and output pacing is provided at a boundary node for uplink traffic in accordance with another embodiment of the present disclosure.

FIG. 7 illustrates the TSN network 500 in which the 5GS 502 is integrated into the TSN network 500 as the virtual 5G TSN bridge 504 for an example in which the 5GS 502 provides output pacing at a boundary of the 5GS 502 in the uplink direction. In other words, in this example, the direction of traffic in the TSN network 500 corresponds to the uplink direction in the 5GS 502 and, in this case, the UPF 514 is the boundary of the 5GS 502 and, as such, the UPF 514 provides an output packing mechanism.

In this example, output pacing is performed at the UPF 514 in the uplink direction as follows. Note that the numerals illustrated in FIG. 7 correspond to the numerals in the list below.

1. To be able to adjust the output pacing at boundary of the 5GS 502 (e.g., at the UPF 514 in the example of FIG. 7) in the same pace as the subsequent TSN node(s) 506, nodes (e.g., UE 510, gNB 512, and UPF 514) inside the 5GS 502 need to be synchronized. The reference clock (grandmaster) in the 5GS 502 should be aligned with the reference clock in the TSN network 500 (i.e., aligned with the reference clock used by the other TSN nodes 506 and 508). That is, the reference clock in the 5GS 502 and the reference clock in the TSN network 500 have the same notion of time and level accuracy so that these reference clocks do not go off from each other. In some embodiments, the reference clock of the 5GS 502 can even be the same as the one used by TSN network 500. The time synchronization can be implemented, e.g., using 802.1AS or other IEEE 1588 profiles.

2. The 5GS 502 learns the pattern of time critical traffic (i.e., time critical user plane traffic) transmitted by the previous hop TSN node 506. Any learning mechanism may be used. Two examples are given below and are referred to herein as option (a) and option (b). In general, in option (a), the 5GS 502 obtains information from the CNC and/or CUC of the TSN network 500 regarding the pattern of time critical traffic, preferably on a per TSN flow basis. This information may include, for example, the size of the traffic (e.g., the size of the packets/frames), the time period (e.g., the time period or duration of the packets/frames), and/or the time gap between the packets/frames, as explained below in more detail. In option (b), the 5GS 502 learns information regarding the pattern of time critical traffic transmitted by the previous hop TSN node 506, preferably on a per TSN flow basis, by examining the frames/packets arriving at the 5G user plane node(s) (e.g., the UE 510) from the previous hop TSN node 506, as explained below in more detail.

a. In option (a), the CUC and/or CNC of the TSN network 500 sends information (also referred to herein as TSN information) to the control plane of the 5GS 502. This information may be sent to the control plane of the 5GS 502 (e.g., to the AF 532, to the PCF 528, to the SMF 518, or to some other control plane node) directly from the CUC and/or the CNC or via a translator function (e.g., implemented in an AF) that translates CNC and/or CUC specific terminologies to 3GPP compatible mechanism or terminologies. Within the 5GS 502, the UPF 514 receives the TSN information via, for example, the 3GPP signal PDU session establishment/modification procedure. The UE 510 can receive the TSN information via, e.g., NAS signaling at registration or configuration update.

b. In option (b), the UE 510 detects the incoming frames/packets from the previous hop TSN node 506 and, from the detected incoming frames/packets, learns the pattern of time critical traffic incoming from the TSN node 506. In other words, the UE 510 uses the detected incoming frames/packets to learn the TSN information. The UE 510 sends the TSN information to the UPF 514. For example, the UE 510 sends the information to the AMF 516 via NAS signaling, the AMF 516 conveys information to the SMF 518, and the SMF 518 sends the information to the UPF 514 via the PDU session establishment/modification procedure.

3. The traffic in the TSN network 500 can have different QoS requirements, hence different priorities. A 3-bit field priority code point in the Ethernet header is used to define the traffic class of TSN flows (up to eight different traffic classes), which corresponds to a maximum of eight queues in the TSN bridges of a bridged network. When there are multiple incoming TSN flows to the 5GS 502, the 5GS 502 can learn the flow information (e.g., PCP values, traffic classes), for example, via option (a) or option (b) below. It should be noted that, in some embodiments, the 5GS 502 learns the traffic pattern for each TSN flow, in which case the 5GS 502 may learn the TSN flows before learning the traffic patterns for those TSN flows.

a. In option (a), the 5GS 502 first learns number of TSN flows and traffic classes from the CNC and/or CUC (e.g., the 5GS 502 receives information from the CNC and/or CUC that indicates the TSN flows and the associated traffic classes). Then, the 5GS 502 maps those TSN flows belonging to different traffic classes to different 5GS QoS flows [REF: TS 23.501, clause 5.7.1]. Within the 5GS 502, QoS flows may be configured, e.g., by the SMF 518 during the PDU session establishment/modification procedure.

b. In option (b), the UE 510 in the 5GS 502 examines VLAN tags and/or PCP values from the Ethernet frame headers of incoming Ethernet frames, thereby obtaining information regarding the TSN flows. After this, the UE 510 sends the flow information to AMF 516, the AMF 516 sends it to the SMF 518, and the SMF 518 configures the QoS flows with a PDU session establishment/modification request.

4. The UPF 514 conducts pacing on the outgoing (user plane) traffic towards the next TSN node(s) 508. In some embodiments, all incoming TSN flows (from previous TSN node(s) 506 to the 5GS 502), or at least those TSN flows having high priority in the TSN network 500, are associated with a corresponding output buffer at the UPF 514 with data pacing, e.g., according to the specification of CNC and/or CUC. In other words, for each TSN flow, the corresponding user plane traffic is output from the UPF 514 at a pace that is aligned with the pace desired in the TSN network 500 (e.g., at the same pace as the pace learned from the CNC and/or CUC or learned by examining incoming frames/packets from the previous hop TSN node 506). In such a way, the subsequent TSN node(s) 508 (e.g., bridges/end stations) will receive the frames/packets from the UPF 514 in the same pace as desired in the TSN network 500, thereby achieving zero congestion loss.

Figure 8:
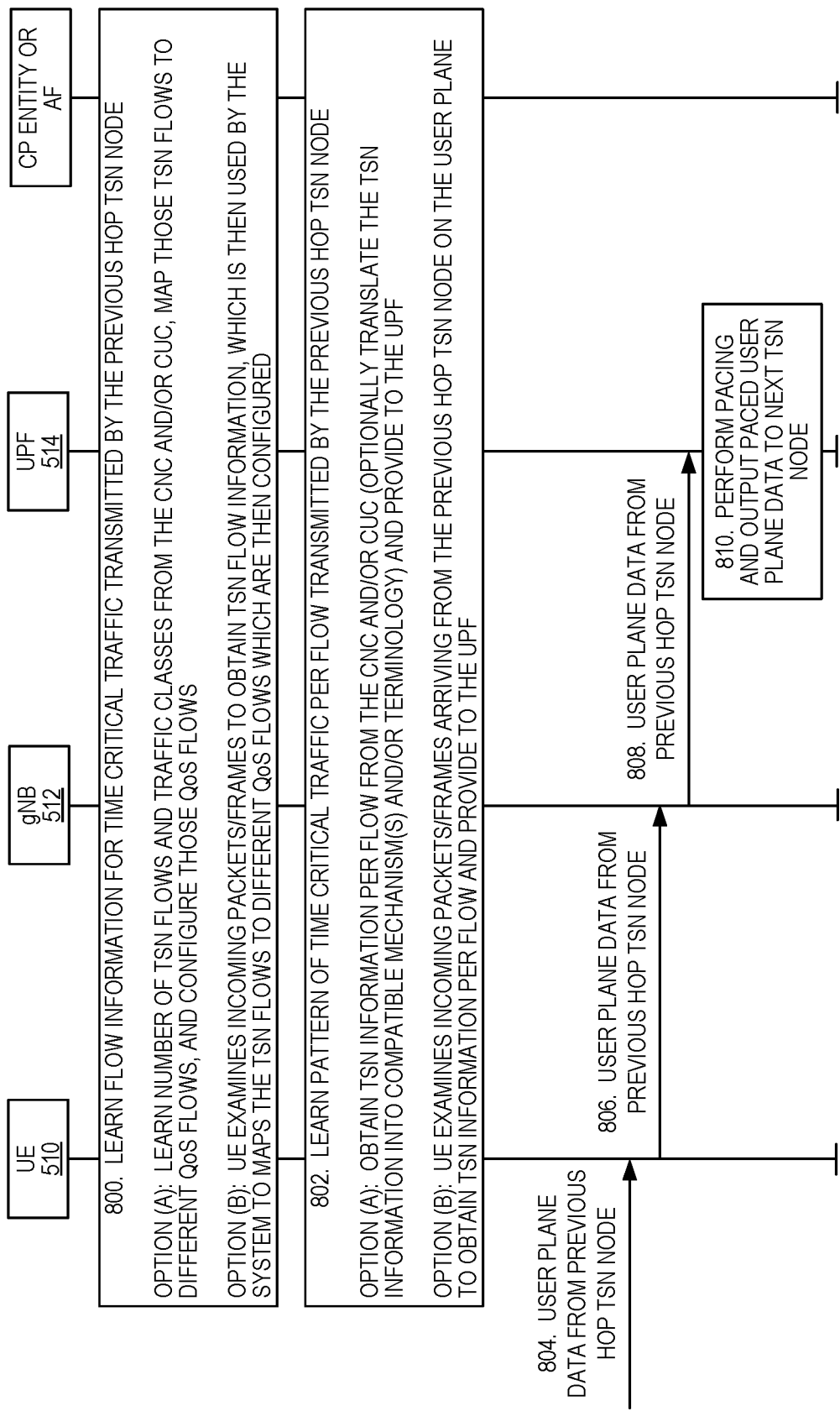
FIG. 8 illustrates the operation of the 5G system of FIG. 7 in accordance with one embodiment of the present disclosure.

The operation of the 5GS 502 for the example of FIG. 7 is illustrated in FIG. 8. As illustrated, the 5GS 502 learns flow information for time critical traffic received from the previous hop TSN node(s) 506 (step 800). The details of this step are given above along with two example options with respect to #3 in the list above given for FIG. 7. The 5GS 502 also learns patterns of the time critical traffic received from the previous hop TSN node(s) 506 (step 802). The details of this step are given above along with two example options with respect to #2 in the list above given for FIG. 7. Note that steps 800 and 802 may be performed in any suitable order or performed in parallel. Then, when incoming (user plane) traffic is received at the UE 510 from the previous hop TSN node 506, the UE 510 sends the traffic to the gNB 512, which transmits the traffic to the UPF 514 (steps 804-808). The UPF 514 performs output pacing of the traffic when providing the traffic to the next TSN node 508 (step 810). The details of this step are given above along with two example options with respect to #4 in the list above given for FIG. 7.

Figure 9:
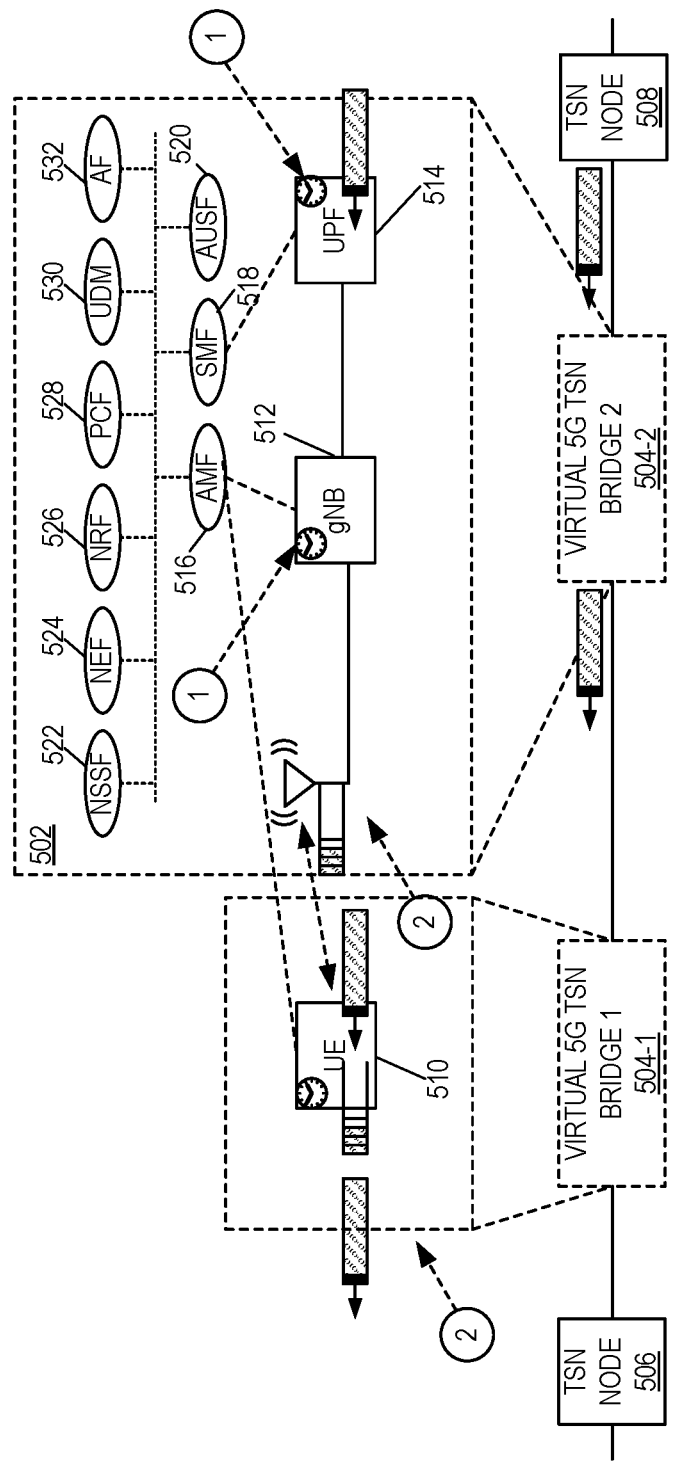
FIGS. 9, 10, and 11 illustrate example variations of the embodiments of FIGS. 5-8 in accordance with some other embodiments of the present disclosure.
Figure 10:
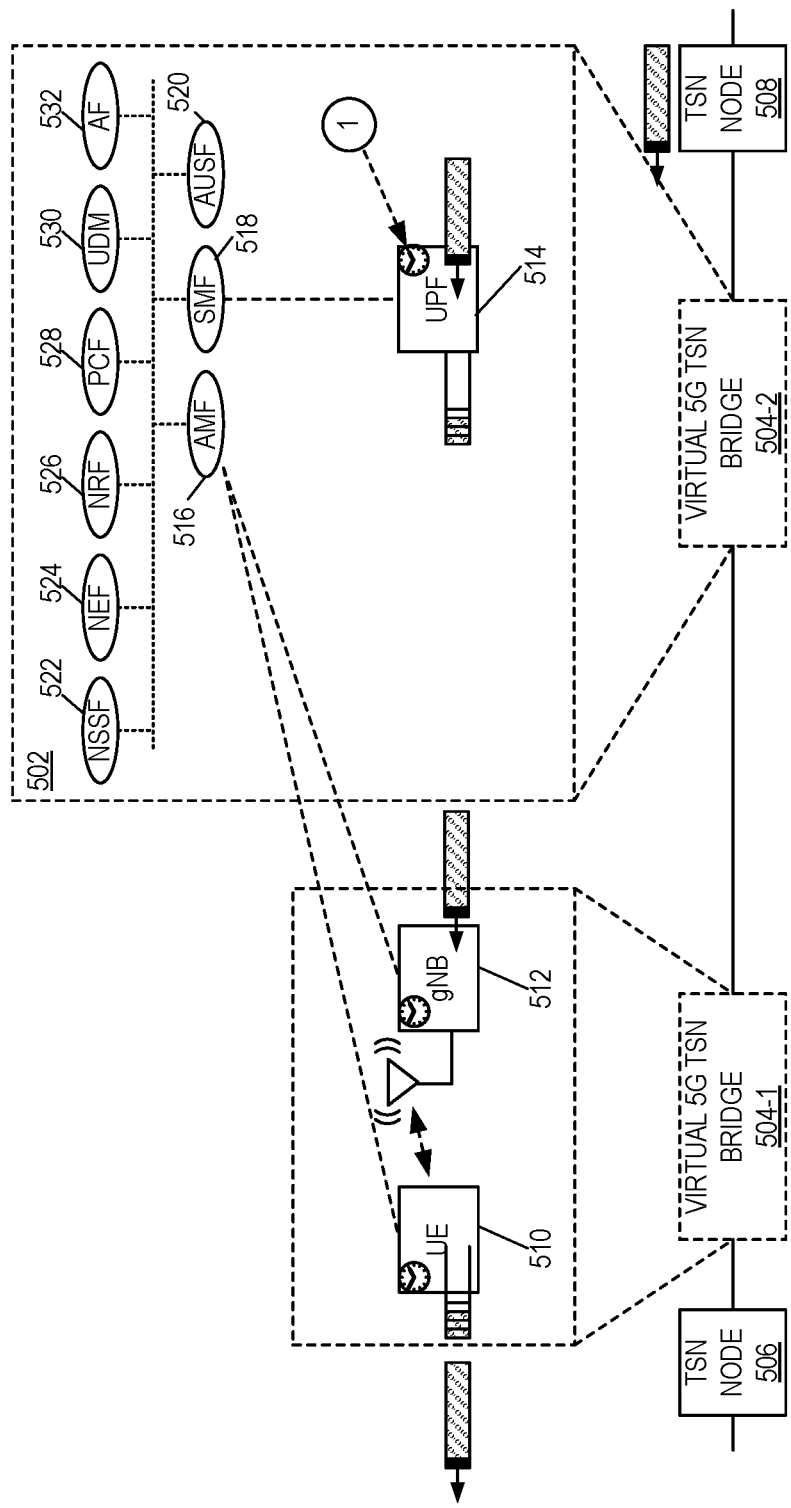

Note that the examples described above with respect to FIGS. 5, 6, 7, and 8 are only examples. Other variations will be apparent to one of skill in the art. For instance, the 5GS 502 may be divided into two or more virtual 5G bridges each including a portion of the 5GS 502. Two such examples for downlink traffic are illustrated in FIGS. 9 and 10. Similar examples for uplink traffic are also applicable.

In this regard, FIG. 9 shows an example of splitting the 5GS 502 into two virtual TSN bridges, where the virtual 5G TSN bridge 504-1 contains only the UE 510, and the virtual 5G TSN bridge 504-2 contains the gNB 512 and core network components (e.g., the UPF 514, the AMF 516, the SMF 518, etc.). In a downlink case, the output pacing at the virtual 5G TSN bridge 504-1 should be implemented in the UE 510 towards the subsequent TSN node 506; while at the virtual 5G TSN bridge 504-2, the output pacing should be implemented in the gNB 512 towards the virtual 5G TSN bridge 504-1 direction. Conversely, for the uplink case, the output pacing at the virtual 5G TSN bridge 504-1 should be implemented in the UE 510 towards the gNB 512 in the virtual 5G TSN bridge 504-2; while at the virtual 5G TSN bridge 504-2, the output pacing should be implemented in the UPF 514 towards the next hop TSN node 508.

FIG. 10 shows an example of splitting the 5GS 502 into two virtual TSN bridges, where the virtual 5G TSN bridge 504-1 contains the UE 510 and the gNB 512, and the virtual 5G TSN bridge 504-2 contains core network components (e.g., the UPF 514, the AMF 516, the SMF 518, etc.). In a downlink case, the output pacing at the virtual 5G TSN bridge 504-1 should be implemented in the UE 510 towards the subsequent TSN node 506; while at the virtual 5G TSN bridge 504-2, the output pacing should be implemented in the UPF 514 towards the virtual 5G TSN bridge 504-1 direction. Conversely, for the uplink case, the output pacing at the virtual 5G TSN bridge 504-1 should be implemented in the gNB 512 towards the UPF 514 in the virtual 5G TSN bridge 504-2; while at the virtual 5G TSN bridge 504-2, the output pacing should be implemented in the UPF 514 towards the next hop TSN node 508.

Figure 11:
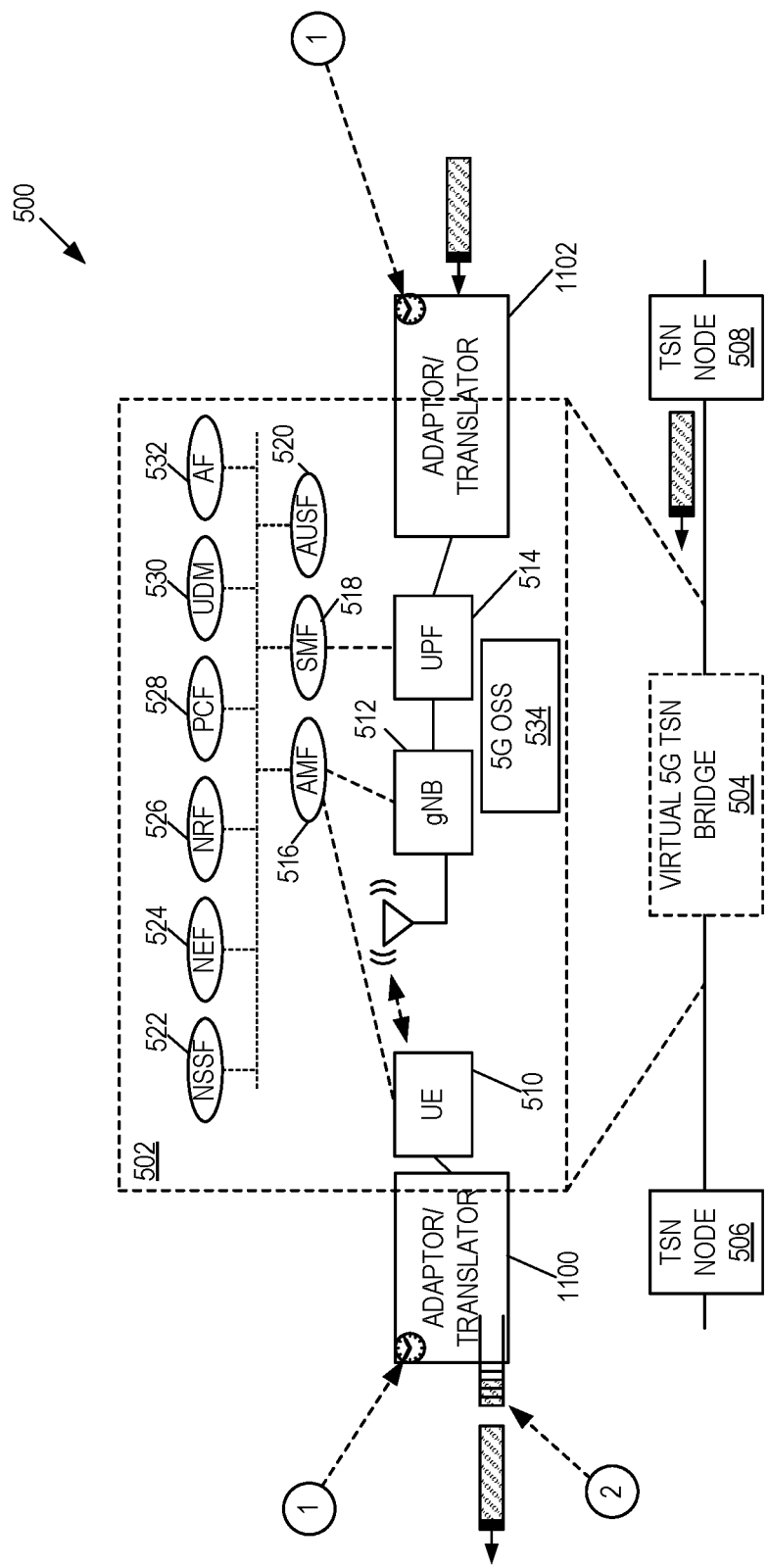

FIG. 11 illustrates an example in which the pacing mechanism or pacing function is implemented as a stand-alone entity between the 5GS 502 and the TSN. Specifically, in this illustrated example (which is for the downlink case), output pacing is performed by an adaptor or translator 1100 between the UE 510 and the TSN node 506 and, optionally, by an adaptor or translator 1102 between the UPF 514 and the TSN node 508. Output pacing for the downlink case is shown in FIG. 11; however, as with the other variations discussed above, the output pacing can also be performed for the uplink case (i.e., output pacing at the adaptor/translator 1102 and, optionally, at the adaptor/translator 1100).

Figure 12:
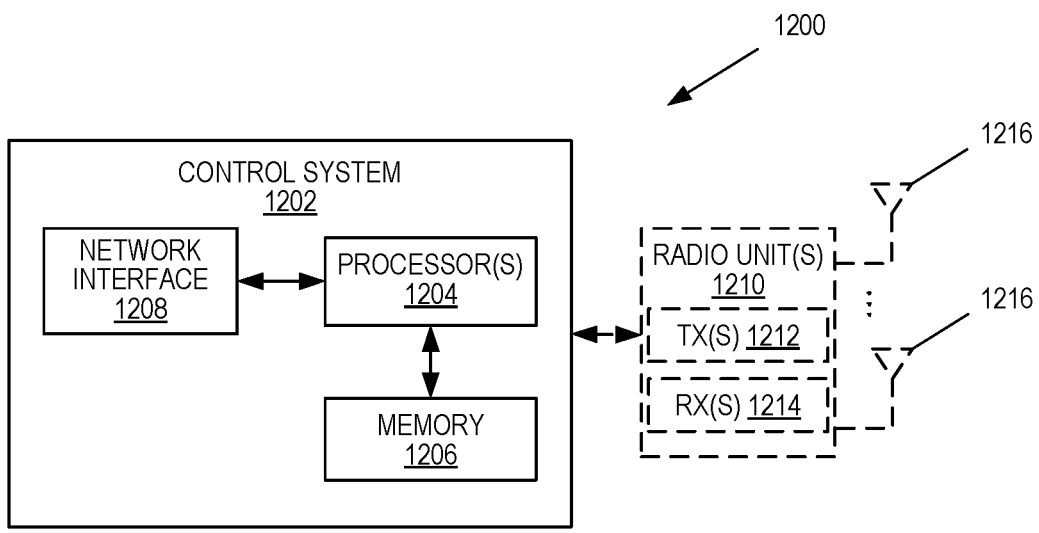
FIGS. 12-14 are block diagrams of example embodiments of a network node according to some embodiments of the present disclosure.

FIG. 12 is a schematic block diagram of a network node 1200 according to some embodiments of the present disclosure. Optional components are represented here with dashed lines. The network node 1200 may be, for example, radio access node (e.g., a base station 202 or 206 such as the gNB 512) or a core network node (e.g., a node implementing a core network function such as, e.g., the UPF 514, the AMF 516, the SMF 518, the PCF 528, or the AF 532). As illustrated, the network node 1200 includes a control system 1202 that includes one or more processors 1204 (e.g., Central Processing Units (CPUs), Application Specific Integrated Circuits (ASICs), Field Programmable Gate Arrays (FPGAs), and/or the like), memory 1206, and a network interface 1208. The one or more processors 1204 are also referred to herein as processing circuitry. In addition, if the network node 1200 is a radio access node, the network node 1200 also includes one or more radio units 1210 that each includes one or more transmitters 1212 and one or more receivers 1214 coupled to one or more antennas 1216. The radio units 1210 may be referred to or be part of radio interface circuitry. In some embodiments, the radio unit(s) 1210 is external to the control system 1202 and connected to the control system 1202 via, e.g., a wired connection (e.g., an optical cable). However, in some other embodiments, the radio unit(s) 1210 and potentially the antenna(s) 1216 are integrated together with the control system 1202. The one or more processors 1204 operate to provide one or more functions of a network node 1200 (e.g., the gNB 512, the UPF 514, the AMF 516, the SMF 518, the PCF 528, or the AF 532) as described herein. In some embodiments, the function(s) are implemented in software that is stored, e.g., in the memory 1206 and executed by the one or more processors 1204.

Figure 13:
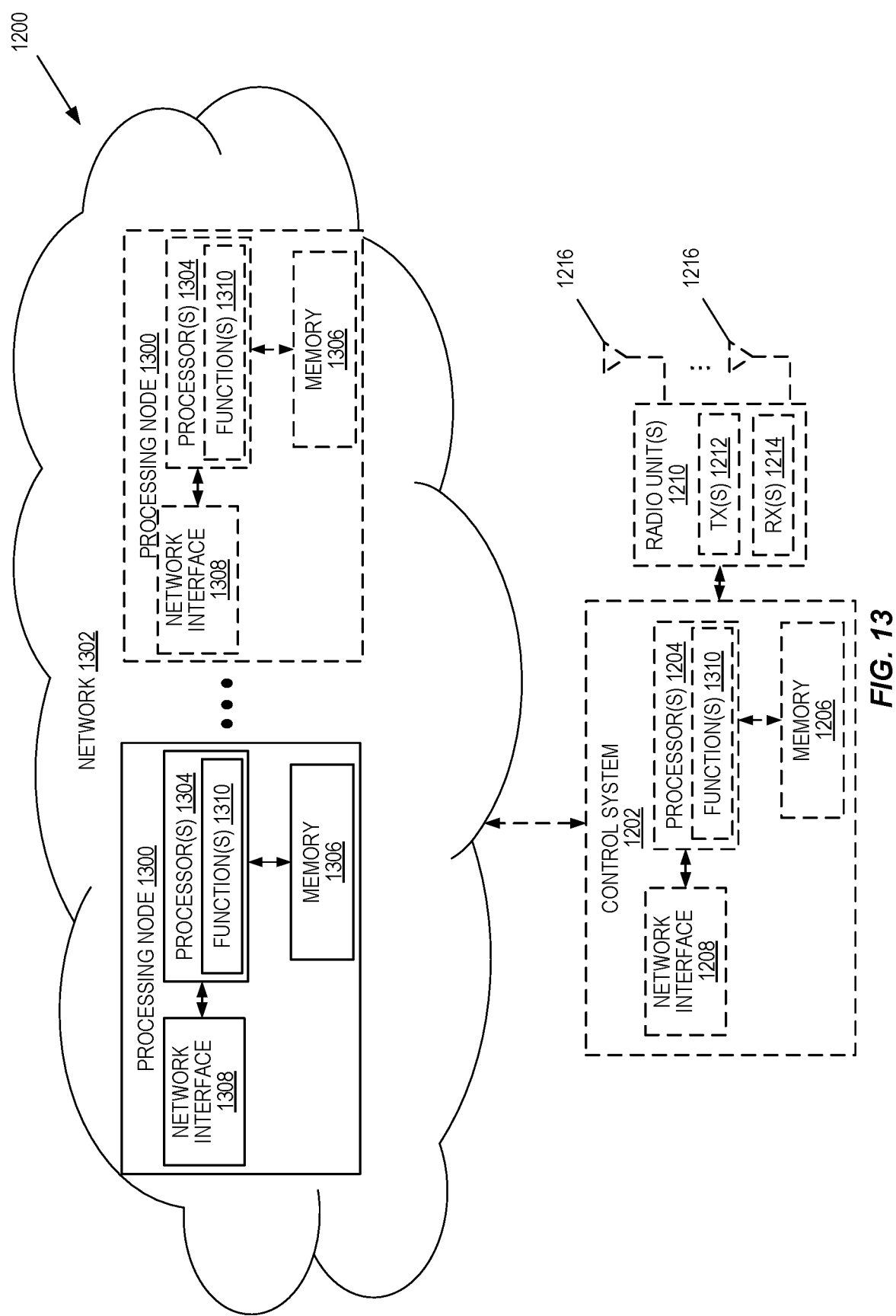

FIG. 13 is a schematic block diagram that illustrates a virtualized embodiment of the network node 1200 according to some embodiments of the present disclosure. Optional components are represented here with dashed lines. As used herein, a "virtualized" radio access node is an implementation of the network node 1200 in which at least a portion of the functionality of the network node 1200 is implemented as a virtual component(s) (e.g., via a virtual machine(s) executing on a physical processing node(s) in a network(s)). As illustrated, in this example, the network node 1200 includes one or more processing nodes 1300 coupled to or included as part of a network(s) 1302 via the network interface 1208. Each processing node 1300 includes one or more processors 1304 (e.g., CPUs, ASICs, FPGAs, and/or the like), memory 1306, and a network interface 1308. Optionally, the network node 1200 includes the control system 1202 that includes the one or more processors 1204 (e.g., CPUs, ASICs, FPGAs, and/or the like), the memory 1206, and the network interface 1208 and, if it is a radio access node, the one or more radio units 1210 that each includes the one or more transmitters 1212 and the one or more receivers 1214 coupled to the one or more antennas 1216, as described above. The control system 1202 is connected to the radio unit(s) 1210 via, for example, an optical cable or the like. If present, the control system 1202 is connected to the one or more processing nodes 1300.

In this example, functions 1310 of the network node 1200 described herein are implemented at the one or more processing nodes 1300 or distributed across the control system 1202 and the one or more processing nodes 1300 in any desired manner. In some particular embodiments, some or all of the functions 1310 of the network node 1200 described herein are implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 1202 is used in order to carry out at least some of the desired functions 1310. Notably, in some embodiments, the control system 1202 may not be included, in which case the radio unit(s) 1210 communicate directly with the processing node(s) 1300 via an appropriate network interface(s).

In some embodiments, a computer program including instructions which, when executed by at least one processor, causes the at least one processor to carry out the functionality of network node 1200 or a node (e.g., a processing node 1300) implementing one or more of the functions 1310 of the network node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
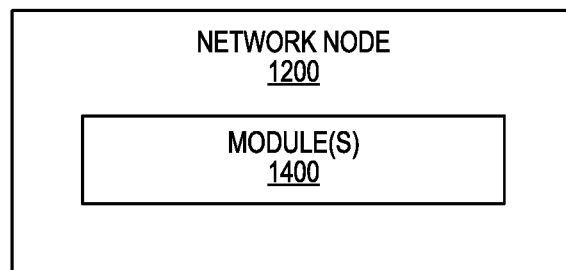

FIG. 14 is a schematic block diagram of the network node 1200 according to some other embodiments of the present disclosure. The network node 1200 includes one or more modules 1400, each of which is implemented in software. The module(s) 1400 provide the functionality of the network node 1200 described herein. This discussion is equally applicable to the processing node 1300 of FIG. 13 where the modules 1400 may be implemented at one of the processing nodes 1300 or distributed across multiple processing nodes 1300 and/or distributed across the processing node(s) 1300 and the control system 1202.

Figure 15:
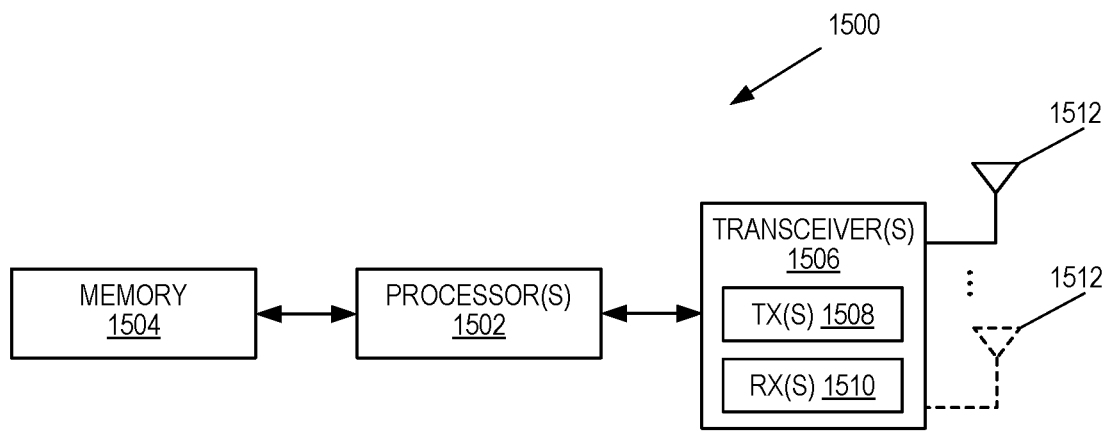
FIGS. 15 and 16 are block diagrams of example embodiments of a User Equipment (UE) according to some embodiments of the present disclosure.

FIG. 15 is a schematic block diagram of a UE 1500 (e.g., the UE 510) according to some embodiments of the present disclosure. As illustrated, the UE 1500 includes one or more processors 1502 (e.g., CPUs, ASICs, FPGAs, and/or the like), memory 1504, and one or more transceivers 1506 each including one or more transmitters 1508 and one or more receivers 1510 coupled to one or more antennas 1512. The transceiver(s) 1506 includes radio-front end circuitry connected to the antenna(s) 1512 that is configured to condition signals communicated between the antenna(s) 1512 and the processor(s) 1502, as will be appreciated by on of ordinary skill in the art. The processors 1502 are also referred to herein as processing circuitry. The transceivers 1506 are also referred to herein as radio circuitry. In some embodiments, the functionality of the UE 1500 described above may be fully or partially implemented in software that is, e.g., stored in the memory 1504 and executed by the processor(s) 1502. Note that the UE 1500 may include additional components not illustrated in FIG. 15 such as, e.g., one or more user interface components (e.g., an input/output interface including a display, buttons, a touch screen, a microphone, a speaker(s), and/or the like and/or any other components for allowing input of information into the UE 1500 and/or allowing output of information from the UE 1500), a power supply (e.g., a battery and associated power circuitry), etc.

In some embodiments, a computer program including instructions which, when executed by at least one processor, causes the at least one processor to carry out the functionality of the UE 1500 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
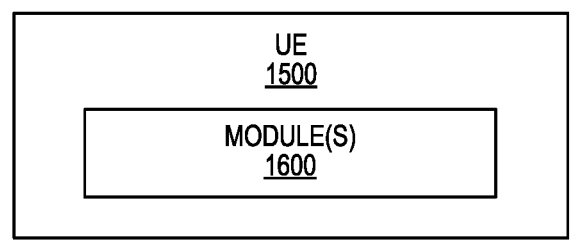

FIG. 16 is a schematic block diagram of the UE 1500 according to some other embodiments of the present disclosure. The UE 1500 includes one or more modules 1600, each of which is implemented in software. The module(s) 1600 provide the functionality of the UE 1500 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method of operation of a User Equipment, UE, (510) in a cellular communications system (502) that operates as a virtual Time-Sensitive Networking, TSN, node (504) in a TSN (500), comprising:
  receiving (608) user plane traffic from a base station (512) in the cellular communications system (502), the user plane traffic being user plane traffic received by the cellular communications system (502) from a previous hop TSN node (508); and
  performing (610) output pacing for the user plane traffic when outputting the user plane traffic to a next hop TSN node (506) such that the user plane traffic is output to the next hop TSN node (506) at a rate that matches a desired rate at the next hop TSN node (506).

Embodiment 2: The method of embodiment 1 wherein the desired rate at the next hop TSN node (506) is the same as a rate at which the incoming user plane traffic was received from the previous hop TSN node (508).

Embodiment 3: The method of embodiment 1 wherein the user plane traffic is associated with a Quality of Service, QoS, flow that is mapped to a particular TSN flow in the TSN (500), and the desired rate at the next hop TSN node (506) is a desired rate at the next hop TSN node (506) for the particular TSN flow.

Embodiment 4: A User Equipment, UE, (510) for a cellular communications system (502) that operates as a virtual Time-Sensitive Networking, TSN, node (504) in a TSN (500), the UE (510) adapted to perform the method of any one of embodiments 1 to 3.

Embodiment 5: A User Equipment, UE, (510, 1500) for a cellular communications system (502) that operates as a virtual Time-Sensitive Networking, TSN, node (504) in a TSN (500), the UE (510, 1500) comprising: at least one receiver (1510); and processing circuitry (1502) associated with the at least one receiver (1510), wherein the processing circuitry (1502) is configured to cause the UE (510, 1500) to perform the method of any one of embodiments 1 to 3.

Embodiment 6: A method of operation of a User Plane Function, UPF, (514) in a cellular communications system (502) that operates as a virtual Time-Sensitive Networking, TSN, node (504) in a TSN (500), comprising:
  receiving (808) user plane traffic from a base station (512) in the cellular communications system (502), the user plane traffic being user plane traffic received by the cellular communications system (502) from a previous hop TSN node (506); and
  performing (810) output pacing for the user plane traffic when outputting the user plane traffic to a next hop TSN node (508) such that the user plane traffic is output to the next hop TSN node (508) at a rate that matches a desired rate at the next hop TSN node (508).

Embodiment 7: The method of embodiment 6 wherein the desired rate at the next hop TSN node (508) is the same as a rate at which the incoming user plane traffic was received from the previous hop TSN node (506).

Embodiment 8: The method of embodiment 6 wherein the user plane traffic is associated with a Quality of Service, QoS, flow that is mapped to a particular TSN flow in the TSN (500), and the desired rate at the next hop TSN node (508) is a desired rate at the next hop TSN node (508) for the particular TSN flow.

Embodiment 9: A User Plane Function, UPF, (514, 1200) for a cellular communications system (502) that operates as a virtual Time-Sensitive Networking, TSN, node (504) in a TSN (500), the UPF (514,1200) adapted to perform the method of any one of embodiments 1 to 3.

Embodiment 10: A User Plane Function, UPF, (514, 1200) for a cellular communications system (502) that operates as a virtual Time-Sensitive Networking, TSN, node (504) in a TSN (500), the UPF (514, 1200) comprising: a network interface (1208, 1308); processing circuitry (1204, 1304) associated with the network interface (1208, 1308), wherein the processing circuitry (1204, 1304) is configured to cause the UPF (514, 1200) to perform the method of any one of embodiments 6 to 8.

Embodiment 11: A method of operation of a cellular communications system (502) that operates as a virtual Time-Sensitive Networking, TSN, node (504) in a TSN (500), comprising:
- receiving (608, 808), at a boundary node (510, 514) of the cellular communications system (502), user plane traffic received by the cellular communications system (502) from a previous hop TSN node (508, 506); and
- performing (610, 810) output pacing for the user plane traffic when outputting the user plane traffic to a next hop TSN node (506, 508) such that the user plane traffic is output to the next hop TSN node (506, 508) at a rate that matches a desired rate at the next hop TSN node (506, 508).

Embodiment 12: The method of embodiment 11 further comprising:
- learning (600, 800) flow information for user plane traffic received from the previous hop TSN node (508, 506) for one or more TSN flows; and
- learning (602, 802) a pattern of user plane traffic received from the previous hop TSN node (508, 506) for the one or more TSN flows;
- wherein the user plane traffic is associated with a Quality of Service, QoS, flow that is mapped to a particular one of the one or more TSN flows, and the desired rate at the next hop TSN node (506, 508) is based on the pattern of user plane traffic learned for the particular one of the one or more TSN flows.

Embodiment 13: A method of operation of a boundary node (510, 512, 514) in a cellular communications system (502) that operates as a virtual Time-Sensitive Networking, TSN, node (504) in a TSN (500), comprising:
- receiving user plane traffic received by the cellular communications system (502) from a previous hop TSN node; and
- performing output pacing for the user plane traffic when outputting the user plane traffic to a next hop TSN node such that the user plane traffic is output to the next hop TSN node at a rate that matches a desired rate at the next hop TSN node.

Embodiment 14: The method of embodiment 13 wherein the boundary node (510, 512, 514) is a User Equipment, UE, (510), and receiving the user plane traffic comprises receiving the user plane traffic via a downlink from a base station.

Embodiment 15: The method of embodiment 14 wherein the base station is part of the cellular communications network (502) operating as the virtual TSN node (504).

Embodiment 16: The method of embodiment 14 wherein the base station is part of the previous hop TSN node.

Embodiment 17: The method of embodiment 13 wherein the boundary node (510, 512, 514) is a User Equipment, UE, (510), and receiving the user plane traffic comprises receiving the user plane traffic from the previous hop TSN node, and performing the output pacing comprises performing the output pacing for the user plane traffic when outputting the user plane traffic via an uplink from the UE (510) to a base station that is part of the next hop TSN node.

Embodiment 18: The method of embodiment 13 wherein the boundary node (510, 512, 514) is a base station (512) in the cellular communication system (502), receiving the user plane traffic comprises receiving the user plane traffic from a User Plane Function, UPF, (514) in the cellular communications system (502), and performing the output pacing comprises performing the output pacing for the user plane traffic when outputting the user plane traffic via downlink from the base station (512) to a User Equipment, UE, (510) that is part of the next hop TSN node.

Embodiment 19: The method of embodiment 13 wherein the boundary node (510, 512, 514) is a User Plane Function, UPF, (514) in the cellular communication system (502), receiving the user plane traffic comprises receiving the user plane traffic from a base station, and performing the output pacing comprises performing the output pacing for the user plane traffic when outputting the user plane traffic to the next hop TSN node.

Embodiment 20: The method of embodiment 19 wherein the base station is part of the cellular communications system (502).

Embodiment 21: The method of embodiment 19 wherein the base station is part of the previous hop TSN node.

Embodiment 22: The method of embodiment 13 wherein the boundary node (510, 512, 514) is a User Plane Function, UPF, (514) in the cellular communication system (502), receiving the user plane traffic comprises receiving the user plane traffic from a previous hop TSN node, and performing the output pacing comprises performing the output pacing for the user plane traffic when outputting the user plane traffic to a base station forming part of the next hop TSN node.

Embodiment 23: The method of any one of embodiments 13 to 22 wherein the desired rate at the next hop TSN node (506) is the same as a rate at which the incoming user plane traffic was received from the previous hop TSN node.

Embodiment 24: The method of any one of embodiments 13 to 22 wherein the user plane traffic is associated with a Quality of Service, QoS, flow that is mapped to a particular TSN flow in the TSN (500), and the desired rate at the next hop TSN node (506) is a desired rate at the next hop TSN node (506) for the particular TSN flow.

Embodiment 25: A boundary node (510, 512, 514) for a cellular communications system (502) that operates as a virtual Time-Sensitive Networking, TSN, node (504) in a TSN (500), the boundary node (510, 512, 514) adapted to perform the method of any one of embodiments 13 to 24.

Embodiment 26: A boundary node (510, 512, 514, 1200, 1500) for a cellular communications system (502) that operates as a virtual Time-Sensitive Networking, TSN, node (504) in a TSN (500), the boundary node (510, 512, 514, 1200, 1500) comprising: at least one receiver (1510) or a network interface (1208, 1308); and processing circuitry (1502, 1204, 1304) associated with the at least one receiver (1510) or the network interface (1208, 1308), wherein the processing circuitry (1502, 1204, 1304) is configured to cause the boundary node (510, 512, 514, 1200, 1500) to perform the method of any one of embodiments 13 to 24.

At least some of the following abbreviations may be used in this disclosure. If there is an inconsistency between abbreviations, preference should be given to how it is used above. If listed multiple times below, the first listing should be preferred over any subsequent listing(s).

μs Microsecond
3GPP Third Generation Partnership Project
5G Fifth Generation
5GS Fifth Generation System
AF Application Function
AMF Access and Mobility Function
AN Access Network
ASIC Application Specific Integrated Circuit
AUSF Authentication Server Function
CNC Centralized Network Configuration
CPU Central Processing Unit
CUC Central User Configuration
DN Data Network
DSP Digital Signal Processor
eNB Enhanced or Evolved Node B
FPGA Field Programmable Gate Array
gNB New Radio Base Station
HSS Home Subscriber Server
IEEE Institute of Electrical and Electronics Engineers
IP Internet Protocol
LTE Long Term Evolution
MME Mobility Management Entity
ms Millisecond
MTC Machine Type Communication
NAS Non-Access Stratum
NEF Network Exposure Function
NF Network Function
NR New Radio
NRF Network Repository Function
NSSF Network Slice Selection Function
OSS Operations Support System
PCF Policy Control Function
PCP Priority Code Point
PDU Protocol Data Unit
PGW Packet Data Network Gateway
PLC Programmable Logic Controller
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
TR Technical Report
TS Technical Specification
TSN Time-Sensitive Networking
UDM Unified Data Management
UE User Equipment
UPF User Plane Function
VLAN Virtual Local Area Network Those skilled in the art will recognize improvements and modifications to the embodiments of the present disclosure. All such improvements and modifications are considered within the scope of the concepts disclosed herein.

REFERENCES

[1] H. Kagermann, W. Wahlster, and J. Helbig, "Recommendations for implementing the strategic initiative INDUSTRIE 4.0", Final report of the Industrie 4.0 working group, acatech—National Academy of Science and Engineering, Munich, April 2013
[2] 3GPP TR. 22.804, Study on Communication for Automation in Vertical domains (CAV)
[3] 3GPP TR. 23. 734, Release 16, Study on enhancement of 5GS for Vertical and LAN Services
[4] 3GPP TR. 38. 825, Release 16, Study on NR industrial Internet of Things (IoT)

What is claimed is:

1. A method of operation of a boundary node within a cellular communications system that operates as at least one virtual Time-Sensitive Networking, TSN, bridge in a TSN network, comprising:
  obtaining TSN information, from a Centralized Network Configuration, CNC, or from a Central User Configuration, CUC, or from both the CNC and the CUC, wherein the TSN information includes at least a time pattern of the multiple packets within the user plane traffic;
  receiving the user plane traffic from a previous hop TSN node; and
  performing output pacing for the user plane traffic when outputting the user plane traffic from the cellular communications system to a next hop TSN node or when outputting the user plane traffic within the cellular communications system, wherein:
    the output pacing for the user plane traffic defines output buffering of the user plane traffic and spacing of the multiple packets within the user plane traffic;
    the spacing of the multiple packets within the user plane traffic is aligned with the time pattern obtained from the CNC, the CUC, or both the CNC and the CUC;
    the spacing of the multiple packets within the user plane traffic is defined to ensure that the user plane traffic is output to the next hop TSN node at a rate that matches a desired rate at the next hop TSN node.

2. The method of claim 1 wherein:
  the boundary node is at a boundary between the TSN network and the cellular communications system, and is a User Equipment, UE;
  receiving the user plane traffic from the previous hop TSN node comprises receiving user plane traffic from a base station, which is the user plane traffic received by the cellular communications system from the previous hop TSN node; and
  performing output pacing for the user plane traffic comprises performing output pacing for the user plane traffic when outputting the user plane traffic from the UE to the next hop TSN node.

3. The method of claim 2 wherein both the UE and the base station are part of the at least one virtual TSN bridge.

4. The method of claim 2 wherein:
  the at least one virtual TSN bridge includes a first virtual TSN bridge and a second virtual TSN bridge; and
  the UE is part of the first virtual TSN bridge, and the base station is part of the second virtual TSN bridge.

5. The method of claim 2 wherein:
  the at least one virtual TSN bridge includes a first virtual TSN bridge and a second virtual TSN bridge; and
  both the UE and the base station are part of the first virtual TSN bridge that is separate from the second virtual TSN bridge.

6. The method of claim 1 wherein:
  the at least one virtual TSN bridge includes a first virtual TSN bridge and a second virtual TSN bridge;
  the boundary node is at a boundary between the TSN network and the cellular communications system, and is a User Equipment, UE, that is part of the first virtual TSN bridge;
  receiving the user plane traffic from the previous hop TSN node comprises receiving the user plane traffic directly from the previous hop TSN node; and performing output pacing for the user plane traffic comprises performing output pacing for the user plane traffic when outputting the user plane traffic via an uplink from the UE to a base station, the base station being part of the second virtual TSN bridge.

7. The method of claim 1 wherein:
the boundary node is at a boundary between the TSN network and the cellular communications system, and (a) is separate from but connected to a User Equipment, UE, that is in the cellular communications system and (b) implements an adaptor or translator function that performs output pacing;
receiving the user plane traffic from the previous hop TSN node comprises receiving user plane traffic from the UE, which is the user plane traffic received by the cellular communications system from the previous hop TSN node; and performing output pacing for the user plane traffic comprises performing output pacing for the user plane traffic when outputting the user plane traffic from the boundary node to the next hop TSN node.

8. The method of claim 1 wherein:
the boundary node is at a boundary between the TSN network and the cellular communications system, and is a User Plane Function, UPF, in a core network of the cellular communications system;
receiving the user plane traffic from the previous hop TSN node comprises receiving user plane traffic from a base station, which is the user plane traffic received by the cellular communications system from the previous hop TSN node; and
performing output pacing for the user plane traffic comprises performing output pacing for the user plane traffic when outputting the user plane traffic from the UPF to the next hop TSN node.

9. The method of claim 8 wherein both the UPF and the base station are part of the at least one virtual TSN bridge.

10. The method of claim 8 wherein:
the at least one virtual TSN bridge includes a first virtual TSN bridge and a second virtual TSN bridge; and
the UPF is part of the first virtual TSN bridge, and the base station is part of the second virtual TSN bridge.

11. The method of claim 1 wherein:
the at least one virtual TSN bridge includes a first virtual TSN bridge and a second virtual TSN bridge;
the boundary node is at a boundary between the TSN network and the cellular communications system, and is a User Plane Function, UPF, that is part of the first virtual TSN bridge;
receiving the user plane traffic from the previous hop TSN node comprises receiving the user plane traffic directly from the previous hop TSN node; and
performing output pacing for the user plane traffic comprises performing output pacing for the user plane traffic when outputting the user plane traffic from the UPF to a base station that is part of the second virtual TSN bridge.

12. The method of claim 1 wherein:
the boundary node is at a boundary between the TSN network and the cellular communications system, and (a) is separate from but connected to a User Plane Function, UPF, in a core network of the cellular communications system and (b) implements an adaptor or translator function that performs output pacing;
receiving the user plane traffic from the previous hop TSN node comprises receiving user plane traffic from the UPF, which is the user plane traffic received by the cellular communications system from the previous hop TSN node; and
performing output pacing for the user plane traffic comprises performing output pacing for the user plane traffic when outputting the user plane traffic from the boundary node to the next hop TSN node.

13. The method of claim 1 wherein:
the at least one virtual TSN bridge includes a first virtual TSN bridge and a second virtual TSN bridge;
the boundary node is at a boundary between the first virtual TSN bridge and the second virtual TSN bridge, and is a base station that is part of the first virtual TSN bridge;
receiving the user plane traffic comprises receiving the user plane traffic from a User Plane Function, UPF, that is in the first virtual TSN bridge; and
performing output pacing for the user plane traffic comprises performing output pacing for the user plane traffic when outputting the user plane traffic from the base station to a User Equipment, UE, via a downlink, the UE being part of the second virtual TSN bridge.

14. The method of claim 1 wherein:
the at least one virtual TSN bridge includes a first virtual TSN bridge and a second virtual TSN bridge;
the boundary node is at a boundary between the first virtual TSN bridge and the second virtual TSN bridge, and is a base station that is part of the first virtual TSN bridge;
receiving the user plane traffic comprises receiving the user plane traffic via an uplink from a User Equipment, UE, that is in the first virtual TSN bridge; and
performing output pacing for the user plane traffic comprises performing output pacing for the user plane traffic when outputting the user plane traffic from the base station to a User Plane Function, UPF, the UPF being part of the second virtual TSN bridge.

15. The method of claim 1 wherein the desired rate at the next hop TSN node is the same as a rate at which the incoming user plane traffic was received from the previous hop TSN node.

16. The method of claim 1 wherein the user plane traffic is associated with a Quality of Service, QoS, flow that is mapped to a particular TSN flow in the TSN network, and the desired rate at the next hop TSN node is a desired rate at the next hop TSN node for the particular TSN flow.

17. The method of claim 1 wherein the TSN information further includes at least one of a size of user plane traffic having multiple packets, the and a time duration of the user plane traffic.

18. The method of claim 1 wherein the desired rate at the next hop TSN node is a rate consistent with the time pattern of the multiple packets within the user plane traffic obtained from the CNC, the CUC, or both the CNC and the CUC.

19. A boundary node within a cellular communications system that operates as at least one virtual Time-Sensitive Networking, TSN, bridge in a TSN network, the boundary node adapted to:
obtain TSN information, from a Centralized Network Configuration, CNC, or from a Central User Configuration, CUC, or from both the CNC and the CUC, wherein the TSN information includes at least a time pattern of the multiple packets within the user plane traffic;
receive the user plane traffic from a node in the cellular communications system, the user plane traffic being user plane traffic received by the cellular communications system from a previous hop TSN node; and
perform output pacing for the user plane traffic when outputting the user plane traffic from the cellular communications system to a next hop TSN node, wherein:
  the output pacing for the user plane traffic defines output buffering of the user plane traffic and spacing of the multiple packets within the user plane traffic;
  the spacing of the multiple packets within the user plane traffic is aligned with the time pattern obtained from the CNC, the CUC, or both the CNC and the CUC;
  the spacing of the multiple packets within the user plane traffic is defined to ensure that the user plane traffic is output to the next hop TSN node at a rate that matches a desired rate at the next hop TSN node.

20. A boundary node within a cellular communications system that operates as at least one virtual Time-Sensitive Networking, TSN, bridge in a TSN network, the boundary node comprising:
  at least one receiver or a network interface; and
  processing circuitry associated with the at least one receiver or the network interface, wherein the processing circuitry is configured to cause the boundary node to:
    obtain TSN information, from a Centralized Network Configuration, CNC, or from a Central User Configuration, CUC, or from both the CNC and the CUC, wherein the TSN information includes at least a pattern of the multiple packets within the user plane traffic;
    receive the user plane traffic from a node in the cellular communications system, the user plane traffic being user plane traffic received by the cellular communications system from a previous hop TSN node; and
    perform output pacing for the user plane traffic when outputting the user plane traffic from the cellular communications system to a next hop TSN node, wherein the output pacing for the user plane traffic defines output buffering of the user plane traffic and spacing of the multiple packets within the user plane traffic;
    the spacing of the multiple packets within the user plane traffic is aligned with the time pattern obtained from the CNC, the CUC, or both the CNC and the CUC;
    the spacing of the multiple packets within the user plane traffic is defined to ensure that the user plane traffic is output to the next hop TSN node at a rate that matches a desired rate at the next hop TSN node.

* * * * *